United States Patent

Nakamura

[11] 4,169,660
[45] Oct. 2, 1979

[54] WIDE-ANGLE ZOOM LENS SYSTEM

[75] Inventor: Soichi Nakamura, Kamakura, Japan

[73] Assignee: Nippon Kogaku K.K., Tokyo, Japan

[21] Appl. No.: 863,338

[22] Filed: Dec. 20, 1977

Related U.S. Application Data

[63] Continuation-in-part of Ser. No. 640,228, Dec. 12, 1975, abandoned.

[30] Foreign Application Priority Data

Dec. 28, 1974 [JP] Japan ............................ 49-1293
Oct. 9, 1975 [JP] Japan ........................ 50-122133
Oct. 29, 1975 [JP] Japan ........................ 50-129186

[51] Int. Cl.$^2$ ............................................. G01B 15/16
[52] U.S. Cl. ............................ 350/176; 350/177; 350/184
[58] Field of Search ................ 350/184, 186, 176, 177

[56] References Cited

U.S. PATENT DOCUMENTS

| | | | |
|---|---|---|---|
| 3,030,863 | 4/1962 | Schwartz et al. | 350/184 |
| 3,143,590 | 8/1964 | Higuchi | 350/184 |
| 3,152,210 | 10/1964 | Gustafson | 350/184 |
| 3,771,853 | 11/1973 | Nakamura | 350/184 |
| 3,848,969 | 11/1974 | Tajima | 350/184 |
| 3,880,498 | 4/1975 | Liu et al. | 350/184 |

*Primary Examiner*—Conrad J. Clark
*Attorney, Agent, or Firm*—Shapiro and Shapiro

[57] ABSTRACT

The wide-angle zoom lens system comprises a divergent lens group and a convergent lens group in the order from the object side, both of the lens groups being movable on the optical axis of the lens system to vary the air space between the two groups so that the magnification of the image is variable while the image plane is being maintained at a fixed position. The divergent lens group includes four air-spaced components which are, in the order from the object side, a first positive component with the more curved surface facing the object side, a first negative component with the more curved surface facing the image side, a second negative component with the more curved surface facing the image side and a first positive meniscus component convex to the object side. The first positive component and the first negative component define therebetween an air chamber having convergent power. The first negative component and the second negative component define therebetween an air chamber having divergent power with its more curved surface facing the object side. The axial space between the second negative component and the first positive meniscus component is greater than the space between the first positive component and the first negative component. The convergent lens group includes at least four positive components and a negative component intervening among the positive components, all components being separated from one another.

25 Claims, 28 Drawing Figures

FIG. 18
| SPHERICAL ABERRATION | ASTIGMATISM | DISTORTION |
|---|---|---|
| 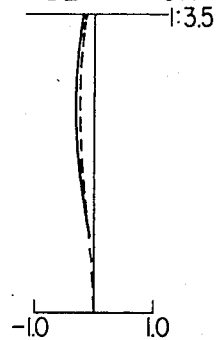 1:3.5 | 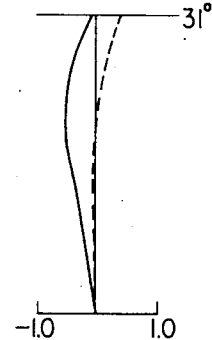 31° | 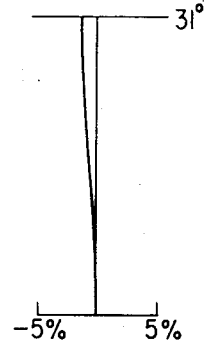 31° |
| 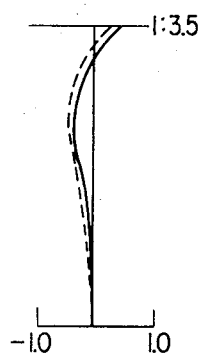 1:3.5 | 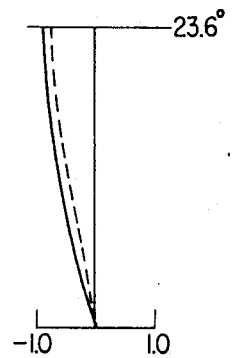 23.6° | 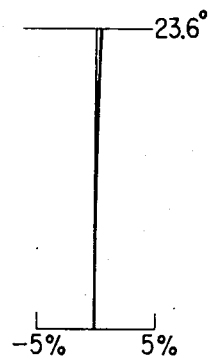 23.6° |
| 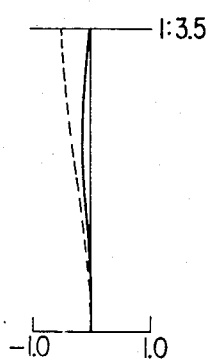 1:3.5 | 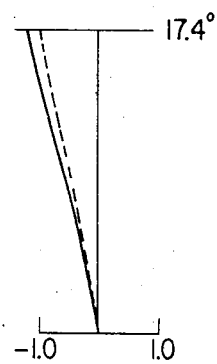 17.4° | 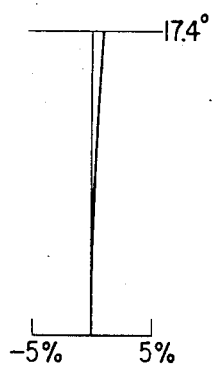 17.4° |

# WIDE-ANGLE ZOOM LENS SYSTEM

BACKGROUND OF THE INVENTION

This application is a continuation-in-part of my pending Application Ser. No. 640,228; filed Dec. 12, 1975 now abandoned.

FIELD OF THE INVENTION

This invention relates to a wide-angle zoom lens system, and more particularly to a wide-angle zoom lens system in which a lens group having a diverging function precedes.

DESCRIPTION OF THE PRIOR ART

The zoom lens system of the described type in which a lens group having a diverging function precedes has a power arrangement of the inverted telephoto type and is advantageous when it covers a wide angle of view while on the other hand it has suffered from great fluctuations of spherical aberration and coma and has not been free from the tendency that distortion becomes greatly negative at the short focal length side. When all these aberrations are to be well corrected, it has been necessary to secure long focal lengths for the diverging lens group and for the subsequent converging lens group and this has in turn led to the bulkiness of the entire configuration and a greater amount of movement of the two groups, which has thus meant limitations in compactness and difficulties in practicability.

SUMMARY OF THE INVENTION

The present invention intends to eliminate the above-noted disadvantages and to provide a wide-angle zoom lens system in which the configuration of the lens is small-sized while various aberrations are corrected in a well-balanced manner, especially, distortion is greatly reduced as compared with the zoom lens system of the prior art.

According to the present invention, the zoom lens system comprises, as viewed from the object side, a divergent lens group and a convergent lens group disposed rearwardly of the divergent lens group. A fixed image plane providing a reference is set behind the convergent group and by moving the convergent group, the magnification on the reference image plane may be changed in response to movement of the convergent lens group while the divergent group is movable so that the front focal point of the forward group is coincident with the position of the conjugate point of the reference image plane with respect to the convergent lens group.

More specifically, the wide-angle zoom lens system of the invention comprises a divergent lens group and a convergent lens group in the order from the object side, both of the lens groups being movable on the optical axis of the lens system to vary the air space between the two groups so that the magnification of the image is variable while the image plane is being maintained at a fixed position. The divergent lens group includes four air-spaced components which are, in the order from the object side, a first positive component with the more curved surface facing the object side, a first negative component with the more curved surface facing the image side, a second negative component with the more curved surface facing the image side and a first positive meniscus component convex to the object side. The first positive component and the first negative component define therebetween an air chamber having convergent power. The first negative component and the second negative component define therebetween an air chamber having divergent power with its more curved surface facing the object side. The axial space between the second negative component and the first positive meniscus component is greater than the space between the first positive component and the first negative component. The convergent lens group includes at least four positive components and a negative component intervening among the positive components, all components being separated from one another.

Various embodiments of the present invention will hereinafter be described in detail by reference to the accompanying drawings.

BRIEF DESCRIPTION OF THE DRAWINGS

FIGS. 15 to 28 illustrate various aberrations under various focal length conditions in Embodiments 1 to 14.

DESCRIPTION OF THE PREFERRED EMBODIMENTS

Figure 1:
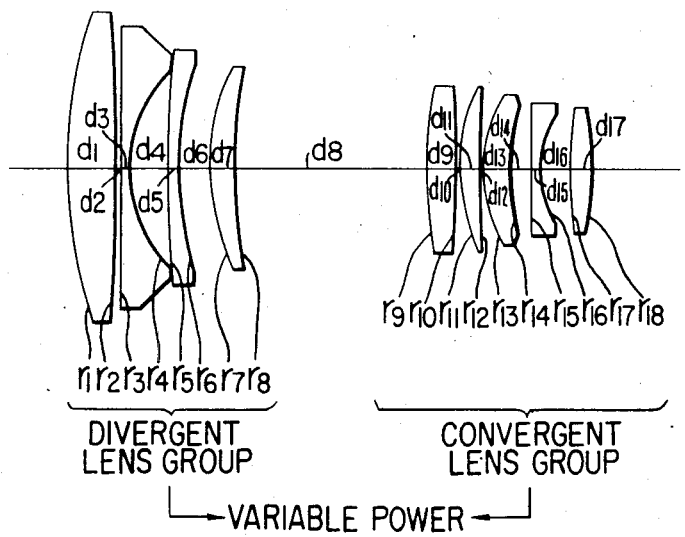
FIGS. 1 to 14 are sectional views showing Embodiments 1 to 14 of the present invention.

In the zoom lens system of the invention, significant conditions which mark the configurations of the divergent and convergent lens groups may be considered with reference to the shortest focal length given as $f\,max/Z$ wherein $f\,max$ stands for the longest focal length of the total system and the zoom ratio $Z$. An air space between the divergent and convergent lens groups when the two lens groups come nearest in the longest focal length condition is designated by $\Delta$ and the principal plane distances between the divergent and convergent lens groups in the longest focal length and the shortest focal length conditions are designated by $D_{1T}$, $D_{1W}$, respectively. The back focal distance (Bf) in the longest and shortest focal length conditions are designated by $D_{2T}$, $D_{2W}$, respectively.

If the two lens groups are both considered as a thin lens, the following relationship is given:

A focal length $f_2$ of the convergent lens group is:

$$f_2 = \frac{f\,max}{f\,max - f_1} \cdot (-f_1 + \Delta)$$

$$D_{1T} = \Delta$$

$$D_{2T} = f\,max \cdot (1 - \frac{\Delta}{f_1})$$

$$D_{1W} = f_1 + \frac{f\,max - Z \cdot f_1}{f\,max - f_1} \cdot (-f_1 + \Delta)$$

$$D_{2W} = \frac{(f_1 \cdot Z - f\,max) \cdot f\,max}{Z \cdot f_1(f\,max - f_1)} \cdot (-f_1 + \Delta)$$

Therefore, if in the zoom lens as in the present invention each of $f\,max$, $Z$, $f_1$ and $\Delta$ is determined, the basic structure of $f_2$, $D_{1T}$, $D_{2T}$, $D_{1W}$ and $D_{2W}$ can be obtained.

The first positive component in the divergent lens group provides a most significant feature of the zoom lens system of the present invention and plays a substantial role in the correction of the distortion occurring at the short focal length side. More specifically, if a negative meniscus component convex toward the object side is used in place of the first positive component of the divergent lens group, it has been found that even if the angle of deviation of oblique rays could be minimized by the negative meniscus component, the negative distortion of such a wide-angle zoom lens system is much greater than that of a wide-angle lens having a single focal length. It is therefore indispensable that a component having a positive power be introduced at first. Further, it is desirable to satisfy the following condition: $1.2 \leq f_{11}/|f_1| \leq 6.0$, where $f_{11}$ represents the focal length of the first positive component and $f_1$ represents the focal length of the divergent lens group.

If the lower limit of the above condition is exceeded, the spherical aberration occurring at the longer focal length is not corrected because of too great power of the first positive component. If the upper limit of the above condition is exceeded, the distortion is not corrected whatever bendings of the first positive and the first and second negative components are selected.

The subsequent, i.e., the first and the second negative components must necessarily be of strong negative power because the positive component is first introduced for the correction of distortion. Further, when it is taken into consideration that the present zoom lens system should cover an angle of view 74°, the correction of curvature of image field, spherical aberration and distortion could not sufficiently be achieved with only one negative component existing in the divergent lens group. If the curvature radii of rear surfaces of the two negative components as viewed from the object side and R4 and R6, respectively, then the relation that $|R4| < |R6|$ must be established to play an auxiliary role for the reduction of distortion as well as to balance the other various aberrations. And, an air chamber having divergent performance is formed between the first negative and second negative components so that the divergent performance is properly distributed.

The next, i.e., the first positive meniscus component is required primarily for the achromatization of the divergent lens group and the first positive meniscus component must have a small Abbe number.

Remarkably well-corrected distortion is obtained by the first positive component in the divergent lens group being disposed nearest the object side, by the air chamber having covergent performance being formed between the first positive component and the first negative component just adjacent to the positive component and further by the air space between the second negative component and the first positive meniscus component being larger than that between the first positive component and the first negative component. This air space will be discussed in detail later.

When the divergent lens group satisfied the condition: $0.05 \leq D_F/|f_1| \leq 0.2$, where $D_F$ represents the air space between the second negative component and the first positive meniscus component, it has become possible to thicken the divergent lens group and increase the degree of freedom with which the aberrations are corrected, thereby enabling the fluctuation of spherical aberration and the fluctuation of curvature of image field both at the shorter and the longer focal length sides to be corrected simultaneously. If the lower limit of the above condition is exceeded, it is impossible to correct the spherical aberration and the curvature of image field both at the shorter and the longer focal length sides. If the upper limit of the above condition is exceeded, the divergent lens grou is too greatly thickened to limit the range of movement of the convergent lens group so that great zoom ratio cannot be obtained. Further, when the power of the divergent lens group is increased to provide a wider angle zoom lens system, said air space must be increased to suppress the fluctuations of the aberrations caused by the increased power of the divergent lens group.

The first positive meniscus component is configured to be convex toward the object so that a high degree of correction may be made of the spherical aberration at the longest focal length side.

It is known that the convergent lens group must have a great aperture because the forward optical system is a diverging lens group, but when the zoom lens of this type is to be designed with the greatest possible compactness, it is desirable that the converging lens group be one whose front principal plane is jutting forwardly of the lens as in the telephoto type. When a further compactness is desired, it is necessary to increase the powers of both the diverging and the converging lens group and the resultant displacement of the Petzval sum toward the negative sense must also be corrected.

For the reasons set forth above, the present invention employs as the converging lens group five components approximate to the Sonnar type and thereby succeeds in realizing a compact wide-angle zoom lens system. The convergent lens group of the present invention has its principal point forwardly as is peculiar to the Sonnar type and can obtain a great aperture, but increases or promotes the tendency of the Petzval sum to become positive. In other words, the convergent lens group is formed by five components as described and, in order to bring the Petzval sum further toward the positive sense, low refractive indices are chosen for the second positive component and the second and third positive meniscus components while a high refractive index is chosen for the third negative lens, whereby the differences in refractive index between these positive and negative components are increased. Further, when each component is composed of a positive and a negative lens, the refractive index for the positive lens forming the joined surface is chosen to a low level but the refractive index for the negative lens is chosen to a high level so that further variation is added to the apparent refractive index, in order to deliberately bring the Petzval sum toward the positive sense.

In this manner, it has become possible to obtain a wide-angle zoom lens system which is compact as a whole and in which the various aberrations are comparable to those in a lens system with a single focal length and, especailly, the fluctuation of the distortion has been corrected very well.

The specified structure of the convergent lens group is classified into three types. First, when a convergent lens group consists of, in the order from the object side, a second positive component; a second positive meniscus component convex to the object side; a third positive meniscus component convex to the object side; a third negative component and a third positive component, a wide-angle zoom lens having such a convergent lens group is named Type I.

On the other hand, when this zoom lens system is to provide a wider angle of view as in the embodiments shown in FIGS. 7 to 12, it is necessary to increase only the power of the divergent lens group and to move this divergent lens group more toward the object with respect to the convergent lens group; but in terms of aberrations, this, in turn, presupposes that the rearward convergent lens group withstand a wider angle of view. For this reason, among the components of the convergent lens group, the third positive component is divided into a positive meniscus lens subsequent to the third negative component and convex toward the image side and a positive lens to produce the effect of bringing the distortion toward the positive sense and to provide the degree of freedom with which the curvature of image field is corrected, thus enabling a zoom lens system which can withstand a wide angle of view to be also realized. A wide-angle zoom lens having such a convergent lens group is named Type II.

Figure 13:
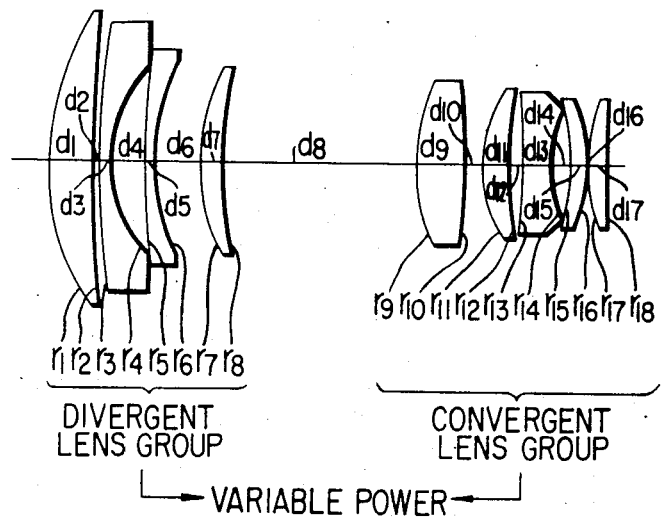
Figure 14:
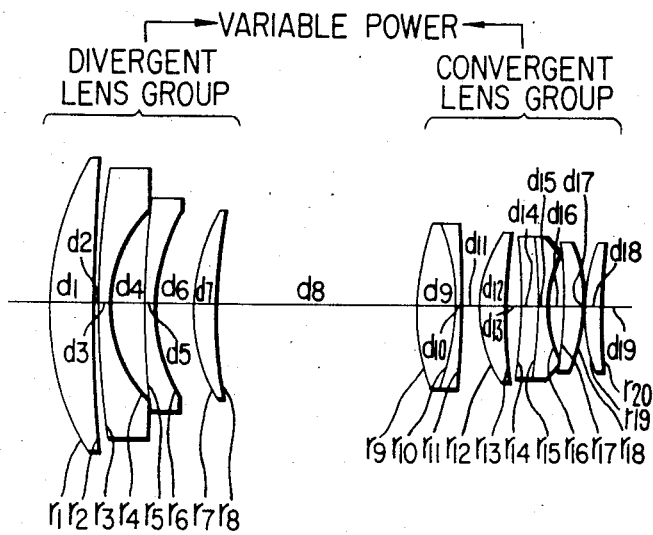

As in the embodiments shown in FIGS. 13 and 14, this invention provides a wide-angle zoom lens system which is smaller in size by eliminating one of the second and the third meniscus components and composing the third positive component of a positive meniscus lens subsequent to the third negative component and convex toward the image side and a positive lens. A wide-angle zoom lens having such a convergent lens group is named Type III.

By employment of the positive meniscus lens as part of the third positive component, curvature radius of the rear surface (i.e., surface nearer to the positive meniscus lens) of the third negative component is able to be made greater, so that it is possible that the oblique rays are passed through the portions of the positive meniscus lens and the positive lens remoter from the optical axis as compared with the Sonnar-type lens system. Therefore, the entrance pupil of the convergent lens group can be brought forward to thereby impart compactness to the entire lens system.

The wide-angle zoom lens system of the present invention may be divided into three types according to the type of convergent lens group. As stated in the Table which follows, the three types desirably satisfy the indicated conditions, which show the relationship of the focal length of each component of the divergent and convergent lens groups respectively.

|  | Type I | Type II | Type III |
|---|---|---|---|
| divergent group | $0.4 < \frac{|f_{12}|}{|f_1|} < 0.9$ | $0.5 < \frac{|f_{12}|}{|f_1|} < 1.6$ | $0.3 < \frac{|f_{12}|}{|f_1|} < 1.1$ |
|  | $1.0 < \frac{|f_{13}|}{|f_1|} < 2.4$ | $1.0 < \frac{|f_{13}|}{|f_1|} < 1.8$ | $0.6 < \frac{|f_{13}|}{|f_1|} < 1.4$ |
|  | $1.3 < \frac{f_{14}}{|f_1|} < 2.4$ | $1.5 < \frac{f_{14}}{|f_1|} < 2.5$ | $1.2 < \frac{f_{14}}{|f_1|} < 2.0$ |
| convergent group | $1.7 < \frac{f_{21}}{f_2} < 3.2$ | $2.0 < \frac{f_{21}}{f_2} < 2.5$ | $0.9 < \frac{f_{21}}{f_2} < 1.7$ |
|  | $1.1 < \frac{f_{22}}{f_2} < 2.2$ | $1.1 < \frac{f_{22}}{f_2} < 1.6$ | $0.9 < \frac{f_{22}}{f_2} < 1.7$ |
|  | $1.0 < \frac{f_{23}}{f_2} < 5.0$ | $2.0 < \frac{f_{23}}{f_2} < 5.0$ | $0.4 < \frac{|f_{23}|}{f_2} < 0.7$ |
|  | $0.4 < \frac{|f_{24}|}{f_2} < 0.8$ | $0.4 < \frac{|f_{24}|}{f_2} < 0.7$ | $1.3 < \frac{f_{24}}{f_2} < 2.5$ |
|  | $0.6 < \frac{f_{25}}{f_2} < 1.5$ | $1.3 < \frac{f_{25}}{f_2} < 2.5$ | $1.5 < \frac{f_{25}}{f_2} < 2.5$ |
|  | — | $1.0 < \frac{f_{26}}{f_2} < 2.0$ | — | wherein $f_{1i}$ and $f_{2i}$ represent the focal length of each component of the divergent group and the convergent group, respectively, and the subscript i represents the order of each component from the object side.

Moreover, the wide-angle zoom lens of each type satisfies the conditions, stated in the Table below, showing the relationship between the shape factor of each component of the divergent and convergent lens groups, respectively.

|  | Type I | Type II | Type III |
|---|---|---|---|
| divergent group | $0.4 < Q_{11} < 2.0$ | $0.8 < Q_{11} < 1.5$ | $1.0 < Q_{11} < 1.5$ |
|  | $0.8 < |Q_{12}| < 1.5$ | $1.0 < |Q_{12}| < 1.8$ | $1.0 < |Q_{12}| < 1.5$ |
|  | $0.9 < |Q_{13}| < 2.2$ | $1.3 < |Q_{13}| < 2.5$ | $1.2 < |Q_{13}| < 1.7$ |
|  | $2.0 < Q_{14} < 6.0$ | $2.0 < Q_{14} < 5.0$ | $2.0 < Q_{14} < 5.0$ |
| convergent group | $0.1 < Q_{21} < 0.7$ | $0.3 < Q_{21} < 1.0$ | $0.4 < Q_{21} < 1.0$ |
|  | $1.0 < Q_{22} < 2.5$ | $1.0 < Q_{22} < 1.6$ | $1.2 < Q_{22} < 2.5$ |
|  | $2.0 < Q_{23} < 8.0$ | $2.0 < Q_{23} < 7.0$ | $0.5 < |Q_{23}| < 0.9$ |
|  | $0.7 < |Q_{24}| < 1.5$ | $0.3 < |Q_{24}| < 0.7$ | $1.5 < |Q_{24}| < 4.0$ |
|  | $0 \leq |Q_{25}| < 1.0$ | $1.2 < |Q_{25}| < 2.5$ | $1.0 < Q_{25} < 2.5$ |
|  | — | $0.3 < Q_{26} < 1.5$ | — | wherein $Q_{1i}$ and $Q_{2i}$ represent the shape factor of each component of the divergent and convergent lens groups, respectively and the subscript i represents the order of each component from the object side. Shape factor Q is defined as $$Q = \frac{r_R + r_F}{r_R - r_F}$$

where $r_R$ and $r_F$ represent radius of curvature of the rearmost and the foremost surfaces of each component, respectively.

These desired conditions are now illustrated in detail.

It is stated in the foregoing that the condition of $f_{11}|f_1|$ in the divergent lens group is important for the correction of the spherical aberration and the distortion. It is possible to better correct distortion by making the first positive component shaped so as to meet the value of $Q_{11}$ in the case of each type without deterioration of change between spherical aberration and astigmatism. The first negative component and second negative component share the inherent function of divergent lens group. The proper refractive power distribution represents the conditions about $|f_{12}|/|f_1|$ and $|f_{13}|/|f_1|$.

If the lower limits of these conditions are exceeded, negative refractive power is superior to result in increasing the refractive power of the successive first positive meniscus component and to hardly correct spherical aberration and distortion.

If the upper limits of these conditions are exceeded, the refractive power of the first positive meniscus component becomes very small, so that the change of spherical aberration and astigmatism in the shortest focal length condition and in the longest focal length condition cannot be prevented. These two negative components generate naturally negative distortion. To meet the conditions concerning $Q_{12}$ and $Q_{13}$ causes deflection angles of off-axis rays at each refractive face to be minimum, and so the occurrence of the negative distortion is kept minimum.

A focal length $f_{14}$ of the first positive meniscus component of the rear component in the divergent lens group is almost determined by $f_1$, $f_{11}$, $f_{12}$, $f_{13}$, and the air space $D_F$, but it is desired to satisfy the conditions stated above. Thus, it is possible to prevent the change of the spherical aberration, astigmatism and coma in the shortest and the longest focal length conditions.

The convergent lens group is classified into three types. Type I as a basic structure is now illustrated.

The convergent lens group of Type I is generally designed to dispose a positive auxiliary lens in front of Sonnar-type lens. An apparent object point with respect to the lens group exists near the lens group, not infinite. The second positive component of the convergent lens group nearest the object side has a function of the auxiliary lens. It is necessary for the front focal point of the second positive component to accord with the front focal point of the divergent lens group when the convergent lens group and the divergent lens group come nearest to each other. It is desired to determine the focal length in the range of $f_{21}$ as shown in a Table attached here. It is also preferable to make the shape factor the value of $Q_{21}$ which provides such a shape that the curved face of the second positive component facing the object side has smaller radius of curvature, in view of residual aberrations in the divergent lens group.

The second positive meniscus component, the successive third negative component and third positive component basically constitute Triplet-type lens. The third positive meniscus component intervening therebetween has a function of making the aperture ratio of the Triplet-type lens greater. The refractive power of the second positive meniscus component is shared partially with the third positive meniscus component as shown in the conditions about $f_{22}$ and $f_{23}$. The second positive meniscus component has the shape convex to the object side which is shown by $Q_{22}$, so that this contributes to move the principal plane of the convergent lens group to the object side. The refractive power of the third positive meniscus component is properly set to make the aperture ratio of the Triplet-type lens greater in the range of $f_{23}$ and the aplanatic shape of the third positive meniscus component is shown by $Q_{23}$. Beyond the range of $f_{23}$, the higher order spherical aberration is hardly well corrected.

The third negative component shares the entirety of the negative refractive power within the convergent lens group. In order to prevent the change of various aberrations, it is desired to set the focal length $f_{24}$ and the shape factor $Q_{24}$ as stated above. If the lower limit of $f_{24}$ is exceeded, negative Petzval sum is increased and also the higher order spherical aberration occurs. It is difficult to make the aperture ratio of the optical system greater. If the upper limit is exceeded, the Petzval sum is positive, but the variation of the aberration cannot be made small over the whole range of the focal length being charged.

It is desired to properly determine the focal length of the third positive component positioned rearmost under the above conditions, so that it is possible to obtain a positive distortion while keeping the convergent lens group small-sized and to cancel negative distortion left in the divergent lens group. If the shape of the third positive component is set in the set range of $Q_{25}$, it is possible to well correct distortion and spherical aberration.

The Type II has such construction that the third positive component which is positioned rearmost in the convergent lens group in the Type I is divided into positive meniscus component and positive component so as to obtain the aperture ratio which is made greater. In the front components of the convergent lens group, conditions about the front components are set based upon the same reason as in the Type I. It is desired to meet the conditions about $f_{25}$, $Q_{25}$ and $f_{26}$, $Q_{26}$ which each of the positive meniscus component and positive component has, so that it is possible to well and easily correct astigmatism, curvature of field and coma with respect to an oblique ray having larger incident angle. The condition of $Q_{26}$ is effective to correct distortion without deterioration of other aberrations. These conditions cause the radius of curvature of the third negative component facing to the image side to be relatively greater as shown by $Q_{24}$ and the connection of coma can be more easily effected.

The convergent lens group of the Type III has such structure that the second positive meniscus component and the third positive meniscus component in the Type II are combined in a single positive meniscus component having relatively thick center-thickness, and that only two components are positioned in front of a negative component in the convergent lens group.

Conditions $f_{21}$, $Q_{21}$ and $f_{22}$, $Q_{22}$ about these two components in front are determined under the above conditions, thus, well-correcting the entire aberrations including higher order spherical aberration. The center thickness of these two components are made greater to carry out the correction of aberration.

Two components following the negative component are conditioned based upon the same reason as in the Type II. These conditions cause the various aberrations, including higher order spherical aberration to be well corrected over the entire range of the change of the focal length.

Any of Embodiments 1 to 6 hereinafter described relate to a wide-angle zoom lens system which covers a half angle of view 31° under the shortest focal length condition. Embodiments 7 to 12 hereinafter described relate to an ultra-wide-angle zoom lens system covering a half angle of view 37° under the shortest focal length condition, and Embodiments 13 and 14 relate to a wide-angle zoom lens system which covers a half angle of view 31° under shortest focal length and which is smaller in size. In any one of these embodiments, the various aberrations are well corrected and, especially, the distortion is corrected as well as or better than in the single focal length lens system.

Figure 15:
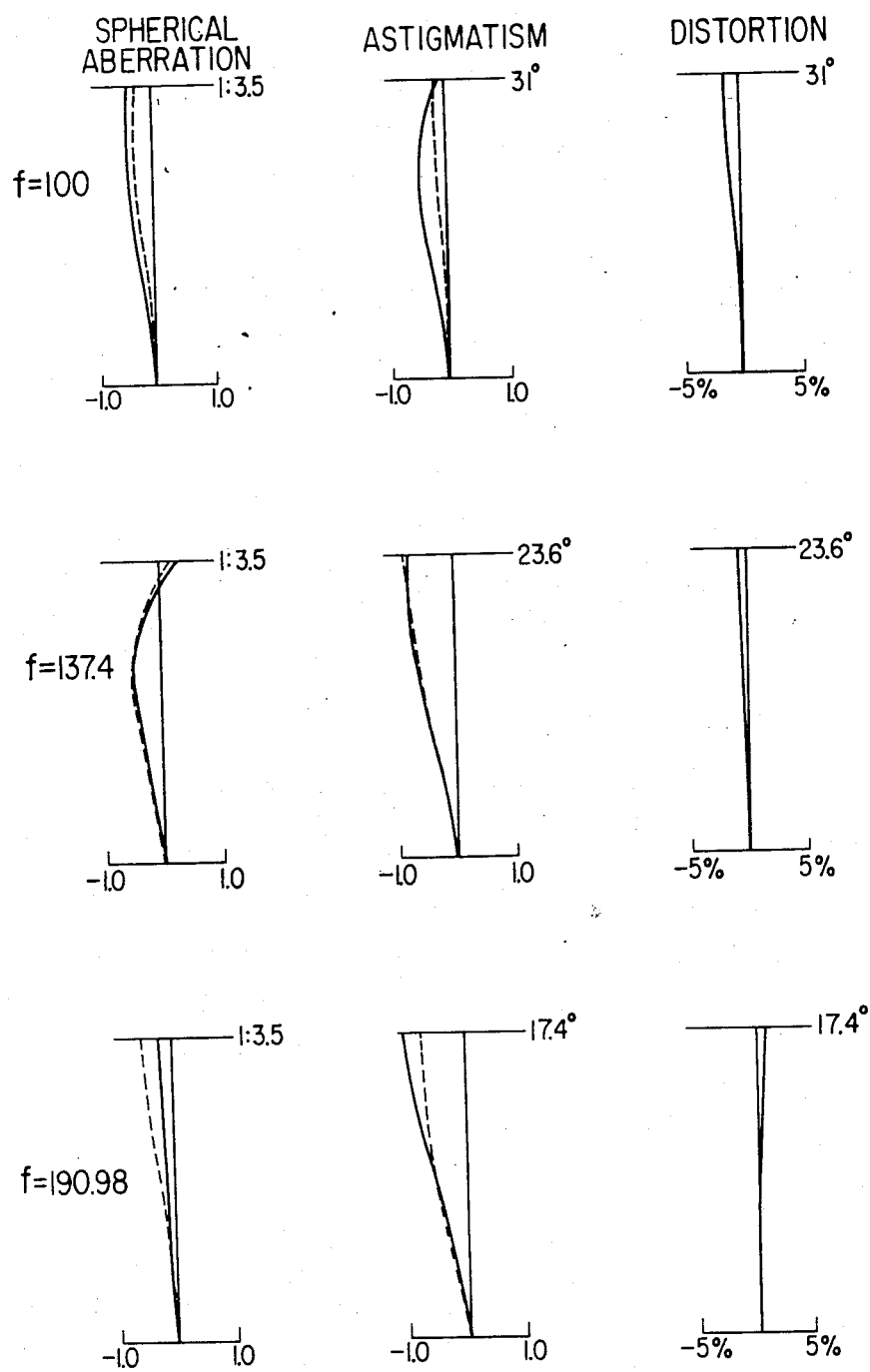

Embodiment 1 is the basic form of the zoom lens system according to the present invention. The shortest focal length condition of the lens arrangement of this embodiment is shown in FIG. 1, and the spherical aberration, astigmatism and distortion under the shortest focal length condition, under the medium focal length condition, and under the longest focal length condition are illustrated in FIG. 15. The numerical data of the lens system according to the present embodiment will be shown in the table below, wherein $r_1$, $r_2$, $r_3$, etc., are the curvature radii of the successive lenses as viewed from the object side; $d_1$, $d_2$, $d_3$, etc., are the center thicknesses of and the air spaces between the successive lenses; and $\eta_1$, $\eta_2$, $\eta_3$, etc., and $\nu_1$, $\nu_2$, $\nu_3$, etc., are the refractive indices and the Abbe numbers of the successive lenses, respectively. (These representations hold true of all the subsequent embodiments.)

Embodiment 1
f = 100 − 137.404 − 190.975   F/3.5
Bf = 121.0703 − 146.391 − 183.869

| $r_1 = 222.515$ | $d_1 = 22.8$ | $n_1 = 1.60311$ | $\nu_1 = 60.7$ |

-continued

Embodiment 1
f=100−137.404−190.975  F/3.5
Bf=121.0703−146.391−183.869

| | | | | |
|---|---|---|---|---|
| | $r_2=-1136.472$ | $d_2=1.9$ | | |
| | $r_3=6006.076$ | $d_3=4.2$ | $n_2=1.6968$ | $\nu_2=55.6$ |
| | $r_4=66.208$ | $d_4=18.9$ | | |
| $f_1=-166.3988$ | $r_5=638.292$ | $d_5=4.2$ | $n_3=1.713$ | $\nu_3=53.9$ |
| | $r_6=157.237$ | $d_6=15.8$ | | |
| | $r_7=102.236$ | $d_7=10.8$ | $n_4=1.74077$ | $\nu_4=27.7$ |
| | $r_8=198.108$ | $d_8=91.3324$ 39.3014 | | 0.2804 |
| | $r_9=183.442$ | $d_9=12.5$ | $n_5=1.52$ | $\nu_5=70.1$ |
| | $r_{10}=-619.365$ | $d_{10}=0.3$ | | |
| | $r_{11}=81.072$ | $d_{11}=13.6$ | $n_6=1.52$ | $\nu_6=70.1$ |
| | $r_{12}=919.732$ | $d_{12}=0.3$ | | |
| $f_2=114.8669$ | $r_{13}=56.898$ | $d_{13}=12.5$ | $n_7=1.52$ | $\nu_7=70.1$ |
| | $r_{14}=97.450$ | $d_{14}=10.8$ | | |
| | $r_{15}=1417.995$ | $d_{15}=4.2$ | $n_8=1.80518$ | $\nu_8=25.5$ |
| | $r_{16}=49.4$ | $d_{16}=14.4$ | | |
| | $r_{17}=193.094$ | $d_{17}=10.5$ | $n_9=1.64831$ | $\nu_9=33.8$ |
| | $r_{18}=-126.146$ | | | |

Figure 2:
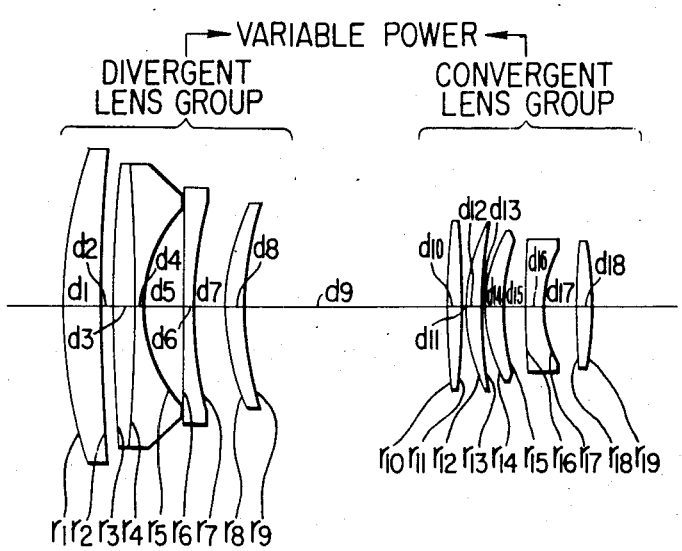
Figure 16:
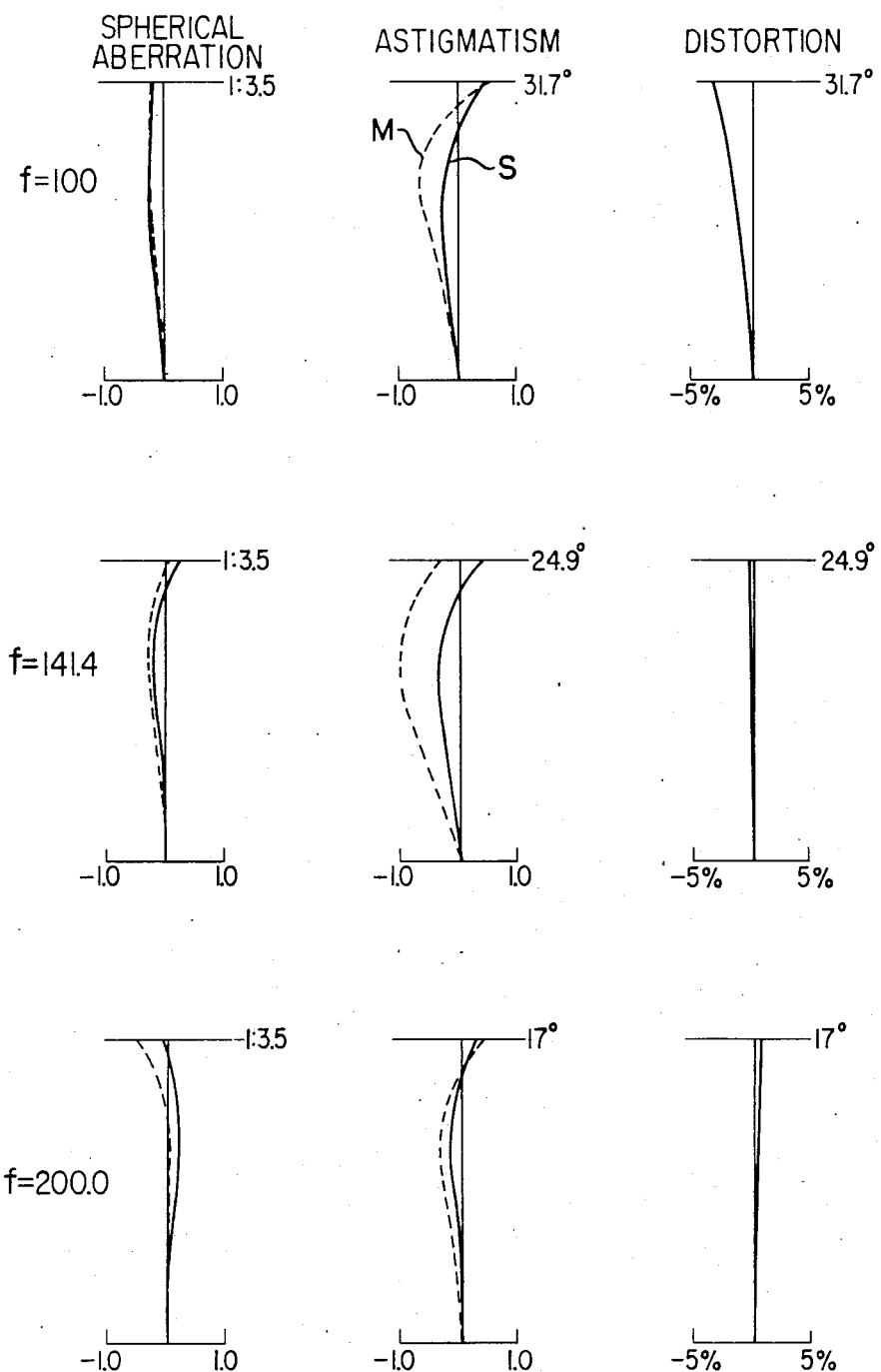

Embodiment 2 employs a doublet as the first negative component to thereby permit the first positive component to be of great Abbe number and thus chromatic aberration corrected to a high degree. The numerical data of the lens system according to this embodiment will be shown below while the lens arrangement thereof is shown in FIG. 2 and the various aberrations under the various focal length conditions are illustrated in FIG. 16.

Figure 3:
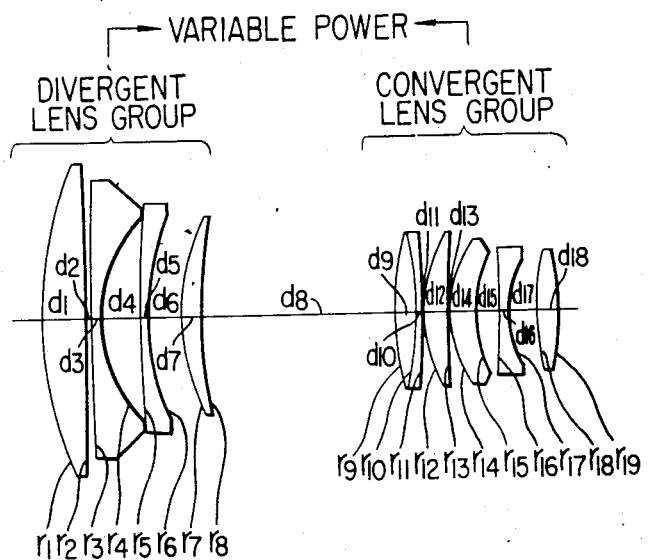

Embodiment 3 employs a doublet as the second positive component at the foremost position in the converging lens group to thereby correct the axial chromatic aberration easier and is useful to reduce the -olor variation of the spherical aberration under the longest focal length condition. The numerical data of the present embodiment will be shown below while the lens arrangement thereof is shown in FIG. 3 and the various aberrations therein under various focal length condi-

Embodiment 2
f=100−141.421−200.0  F/3.5
Bf=121.04−148.469−187.254

Figure 17:
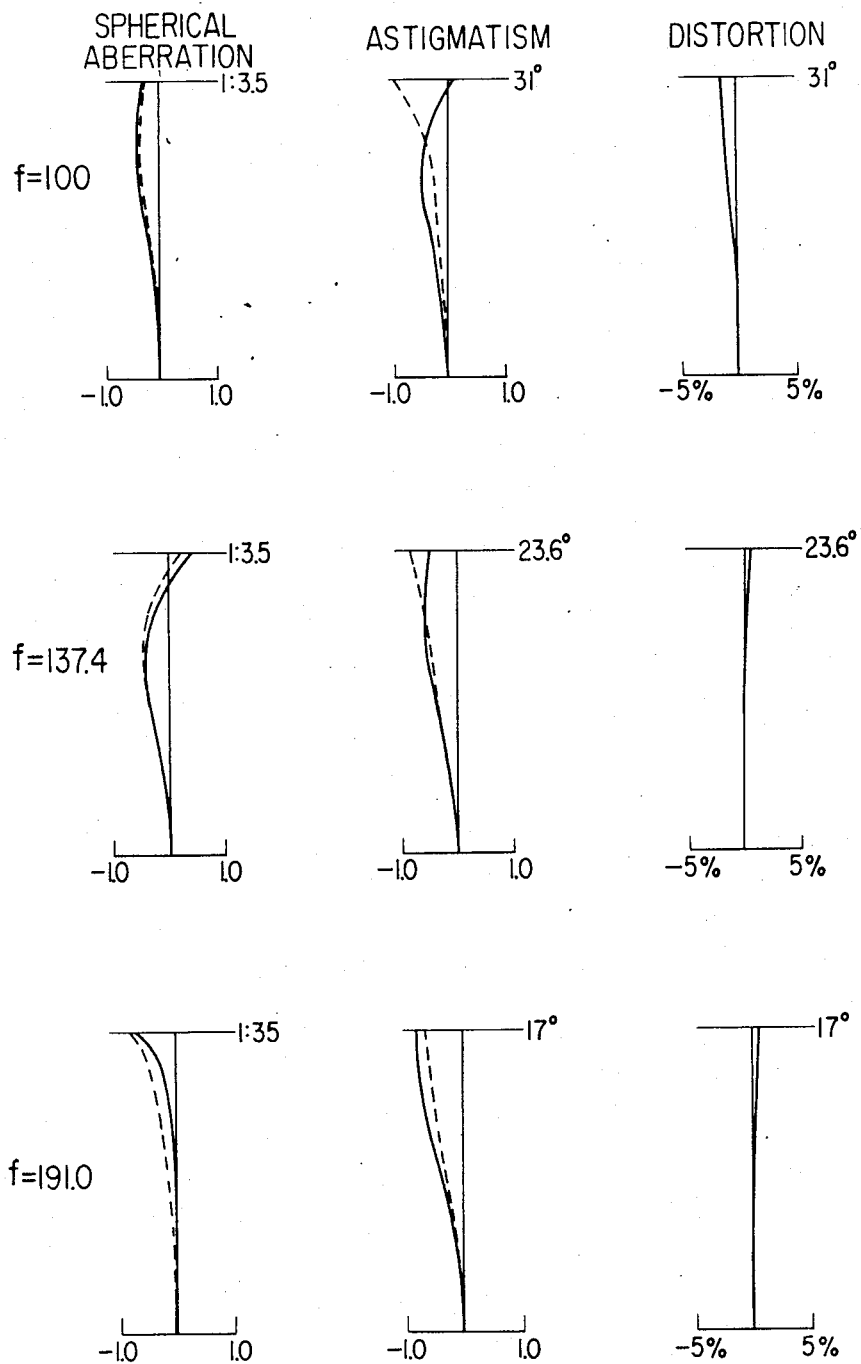

| | | | | |
|---|---|---|---|---|
| | $r_1=206.703$ | $d_1=18.6$ | $n_1=1.62041$ | $\nu_1=60.3$ |
| | $r_2=769.754$ | $d_2=6.3$ | | |
| | $r_3=-671.617$ | $d_3=10.6$ | $n_2=1.80454$ | $\nu_2=39.5$ |
| | $r_4=-971.891$ | $d_4=4.3$ | $n_3=1.67003$ | $\nu_3=47.2$ |
| $f_1=-171.264$ | $r_5=65.723$ | $d_5=19.4$ | | |
| | $r_6=6124.694$ | $d_6=4.3$ | $n_4=1.62041$ | $\nu_4=60.3$ |
| | $r_7=205.649$ | $d_7=15.7$ | | |
| | $r_8=96.714$ | $d_8=8.6$ | $n_5=1.80518$ | $\nu_5=25.5$ |
| | $r_9=141.027$ | $d_9=99.8316\sim42.9479\sim2.7253$ | | |
| | $r_{10}=311.7$ | $d_{10}=7.1$ | $n_6=1.6968$ | $\nu_6=55.6$ |
| | $r_{11}=-394.694$ | $d_{11}=0.3$ | | |
| | $r_{12}=83.54$ | $d_{12}=9.4$ | $n_7=1.62041$ | $\nu_7=60.3$ |
| | $r_{13}=216.683$ | $d_{13}=0.3$ | | |
| $f_2=113.4$ | $r_{14}=61.466$ | $d_{14}=9.7$ | $n_8=1.60311$ | $\nu_8=60.7$ |
| | $r_{15}=110.186$ | $d_{15}=11.1$ | | |
| | $r_{16}=540.08$ | $d_{16}=8.9$ | $n_9=1.80518$ | $\nu_9=25.5$ |
| | $r_{17}=51.494$ | $d_{17}=16.0$ | | |
| | $r_{18}=258.971$ | $d_{18}=8.9$ | $n_{10}=1.70154$ | $\nu_{10}=41.1$ |
| | $r_{19}=-137.347$ | | | | tions are illustrated in FIG. 17.

Embodiment 3
f=100−137.4−191.0  F/3.5  Angle of view 62°−34°
Bf=121.28−147.10−184.08

| | | | | |
|---|---|---|---|---|
| | $r_1=171.693$ | $d_1=22.8$ | $n_1=1.60323$ | $\nu_1=42.5$ |
| | $r_2=-2879.172$ | $d_2=1.9$ | | |
| | $r_3=2776.004$ | $d_3=4.2$ | $n_2=1.67790$ | $\nu_2=55.5$ |
| $f_1=-166.39$ | $r_4=66.347$ | $d_4=18.9$ | | |
| | $r_5=496.166$ | $d_5=4.2$ | $n_3=1.7130$ | $\nu_3=53.9$ |
| | $r_6=118.458$ | $d_6=15.8$ | | |
| | $r_7=94.690$ | $d_7=10.8$ | $n_4=1.59507$ | $\nu_4=35.6$ |
| | $r_8=227.424$ | $d_8=92.86-40.81-1.80$ | | |
| | $r_9=202.204$ | $d_9=9.7$ | $n_5=1.62041$ | $\nu_5=60.3$ |
| | $r_{10}=-202.204$ | $d_{10}=2.8$ | $n_6=1.80518$ | $\nu_6=25.5$ |
| | $r_{11}=-400.225$ | $d_{11}=0.3$ | | |
| | $r_{12}=73.964$ | $d_{12}=13.6$ | $n_7=1.51118$ | $\nu_7=50.9$ |
| | $r_{13}=682.897$ | $d_{13}=0.3$ | | |
| $f_2=114.87$ | $r_{14}=57.583$ | $d_{14}=12.5$ | $n_8=1.51680$ | $\nu_8=64.2$ |
| | $r_{15}=77.700$ | $d_{15}=10.8$ | | |

-continued

Embodiment 3
f=100−137.4−191.0  F/3.5  Angle of view 62°−34°
Bf=121.28−147.10−184.08

| | | |
|---|---|---|
| $r_{16}=-1029.49$ | $d_{16}=4.2$ | $n_9=1.80518$  $\nu_9=25.5$ |
| $r_{17}=51.911$ | $d_{17}=14.4$ | |
| $r_{18}=179.496$ | $d_{18}=10.5$ | $n_{10}=1.64831$  $\nu_{10}=33.8$ |
| $r_{19}=-108.731$ | | |

Figure 4:
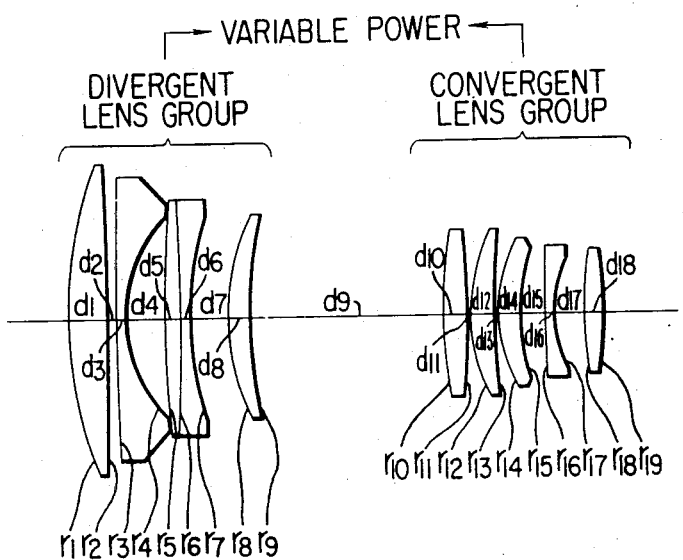

Embodiment 4 employs a doublet as the second negative component to thereby permit the first positive lens to be of great Abbe number and has chromatic aberration corrected to a high degree. The numerical data of the present embodiment will be shown below while the lens arrangement thereof is shown in FIG. 4 and the various aberrations therein under various focal length conditions are illustrated in FIG. 18.

Embodiment 5
f=100−137.404−190.975  F/3.5
Bf=121.7277−147.548−184.528

| | | | | |
|---|---|---|---|---|
| | $r_1=186.079$ | $d_1=18.6$ | $n_1=1.60311$ | $\nu_1=60.7$ |
| | $r_2=8785.220$ | $d_2=3.9$ | | |
| | $r_3=847.055$ | $d_3=4.2$ | $n_2=1.6935$ | $\nu_2=53.4$ |
| | $r_4=66.572$ | $d_4=18.9$ | | |
| $f_1=-166.3988$ | $r_5=562.782$ | $d_5=4.2$ | $n_3=1.713$ | $\nu_3=53.9$ |
| | $r_6=128.685$ | $d_6=16.0$ | | |
| | $r_7=97.596$ | $d_7=16.7$ | $n_4=1.59507$ | $\nu_4=35.6$ |
| | $r_8=6520.952$ | $d_8=2.5$ | $n_5=1.58913$ | $\nu_5=61.2$ |
| | $r_9=239.914$ | $d_9=91.4175\sim 39.3864\sim 0.3654$ | | |
| | $r_{10}=274.822$ | $d_{10}=9.7$ | $n_6=1.62041$ | $\nu_6=60.3$ |
| | $r_{11}=-245.372$ | $d_{11}=2.8$ | $n_7=1.80518$ | $\nu_7=25.5$ |
| | $r_{12}=-527.7$ | $d_{12}=0.3$ | | |
| | $r_{13}=78.69$ | $d_{13}=13.6$ | $n_8=1.51454$ | $\nu_8=54.6$ |
| | $r_{14}=776.541$ | $d_{14}=0.3$ | | |
| $f_2=114.8669$ | $r_{15}=53.662$ | $d_{15}=12.5$ | $n_9=1.51823$ | $\nu_9=59.0$ |
| | $r_{16}=98.753$ | $d_{16}=11.4$ | | |
| | $r_{17}=556.455$ | $d_{17}=3.6$ | $n_{10}=1.80518$ | $\nu_{10}=25.5$ |
| | $r_{18}=46.886$ | $d_{18}=14.4$ | | |
| | $r_{19}=157.306$ | $d_{19}=10.5$ | $n_{11}=1.66446$ | $\nu_{11}=35.9$ |
| | $r_{20}=157.664$ | | | |

Figure 5:
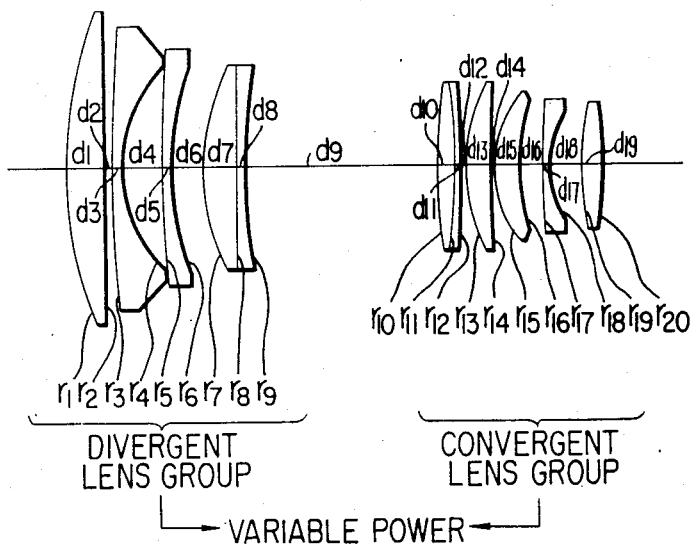
Figure 19:
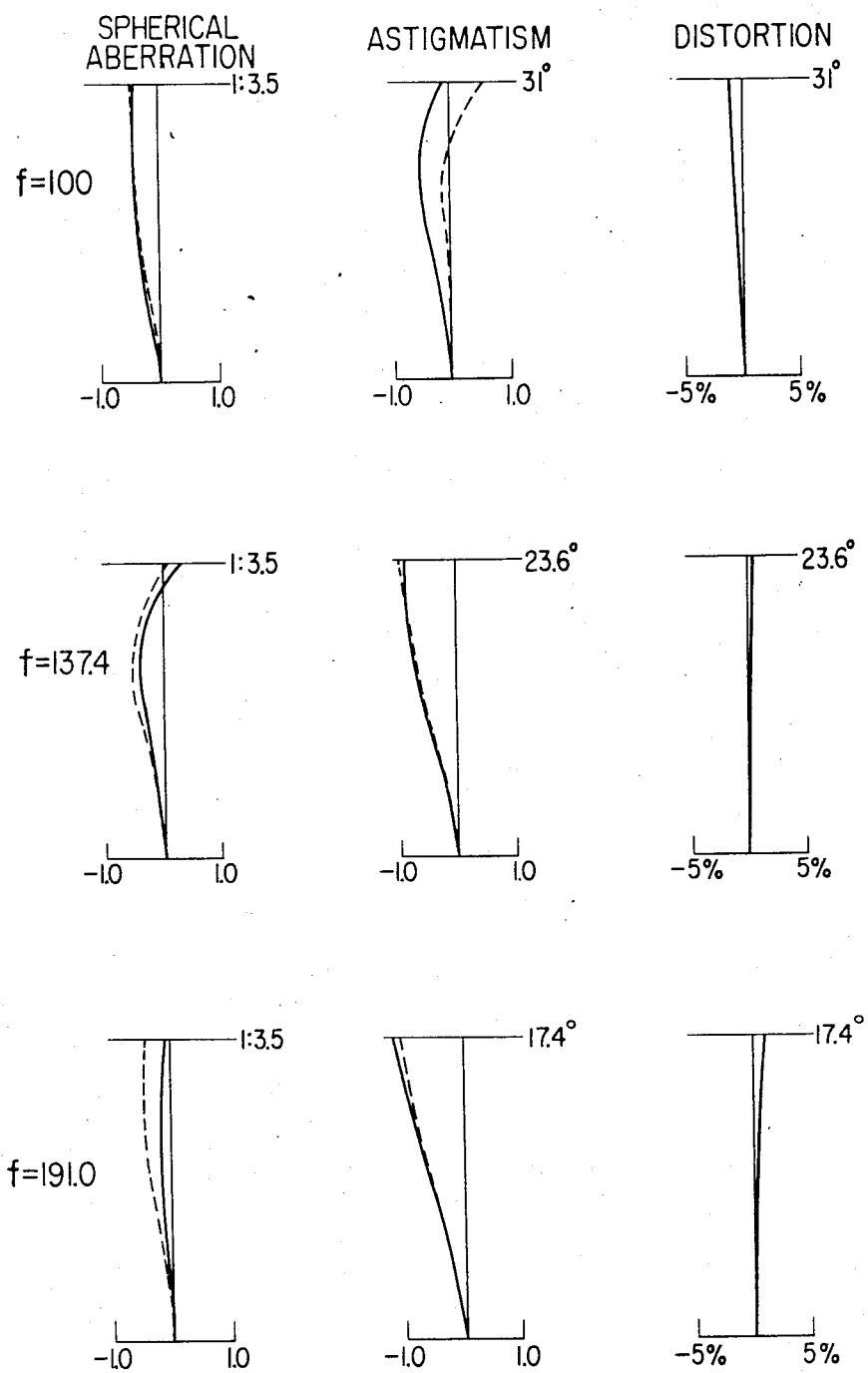

Embodiment 5 employs a doublet as the first positive meniscus component to permit the apparent Abbe number thereof to be reduced, thereby permitting the first positive lens to be of great Abbe number, and has chromatic aberration corrected to a high degree. The numerical data of the present embodiment will be shown below while the lens arrangement thereof is shown in FIG. 5 and the various aberrations therein under various focal length conditions are illustrated in FIG. 19.

Figure 6:
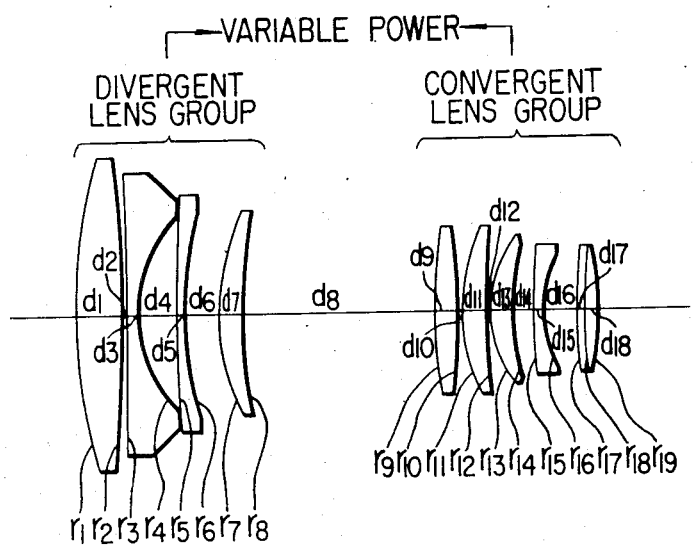
Figure 20:
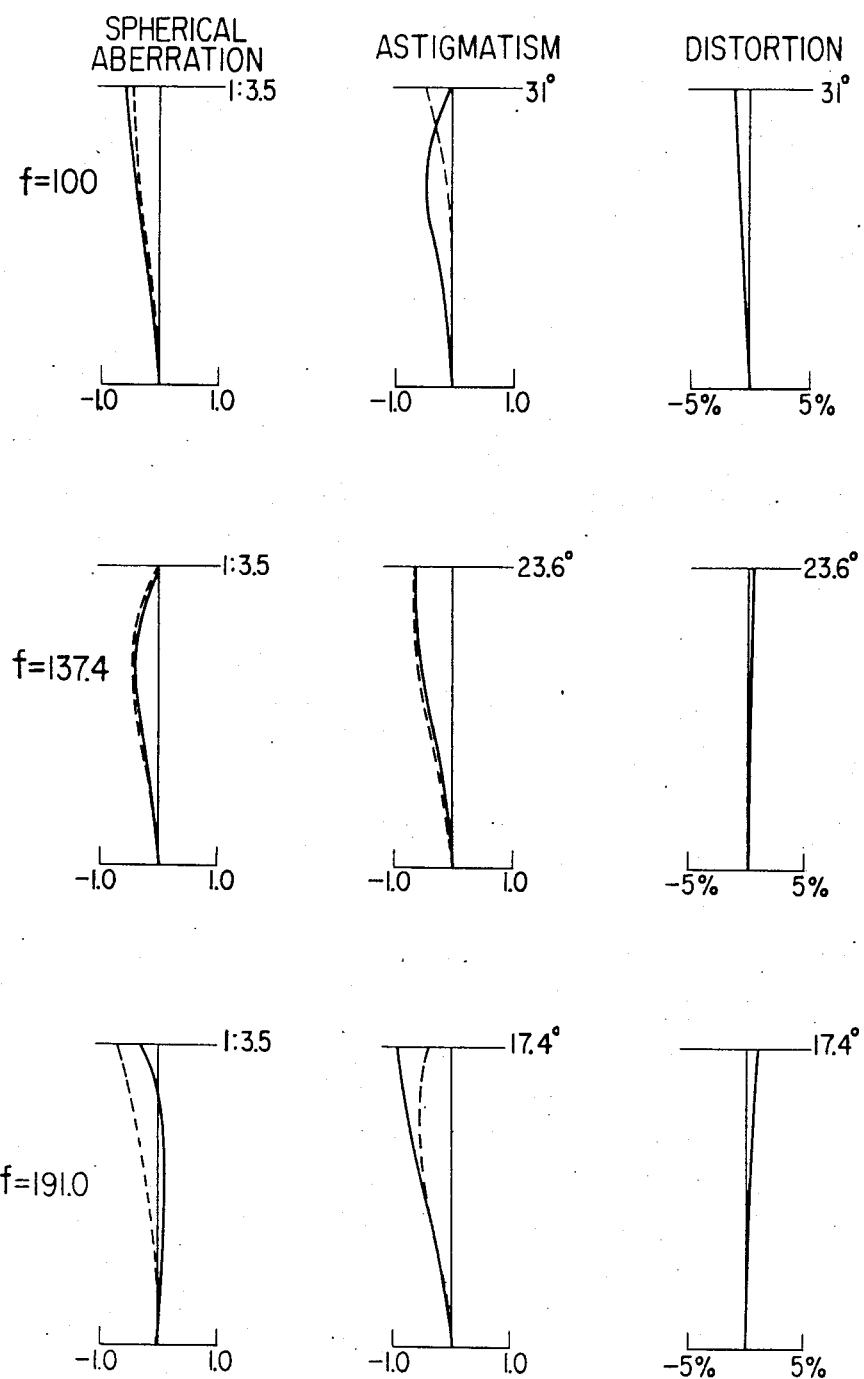

Embodiment 6 adopts the first positive meniscus component of small Abbe number and overcomes the problems of destruction of the Petzval sum resulting from the corresponding increase in refractive index and the fluctuation of chromatic difference of magnification by employing a doublet as the third positive component. The numerical data of the present embodiment will be shown below while the lens arrangement thereof is shown in FIG. 6 and the various aberrations therein under various focal length conditions are illustrated in FIG. 20.

Embodiment 4
f=100−137.404−190.975  F/3.5
Bf=120.761−146.581−183.561

| | | | | |
|---|---|---|---|---|
| | $r_1=194.236$ | $d_1=19.4$ | $n_1=1.60311$ | $\nu_1=60.7$ |
| | $r_2=-2352.847$ | $d_2=3.3$ | | |
| | $r_3=1956.251$ | $d_3=4.2$ | $n_2=1.6935$ | $\nu_2=53.4$ |
| $f_1=-166.3988$ | $r_4=67.296$ | $d_4=18.9$ | | |
| | $r_5=578.411$ | $d_5=8.3$ | $n_3=1.71736$ | $\nu_3=29.5$ |
| | $r_6=-1049.234$ | $d_6=4.2$ | $n_4=1.72$ | $\nu_4=50.3$ |
| | $r_7=154.167$ | $d_7=17.0$ | | |
| | $r_8=99.498$ | $d_8=10.8$ | $n_5=1.61293$ | $\nu_5=36.9$ |
| | $r_9=197.219$ | $d_9=91.2871\sim 39.2561\sim 0.2350$ | | |
| | $r_{10}=169.87$ | $d_{10}=12.5$ | $n_6=1.52$ | $\nu_6=70.1$ |
| | $r_{11}=-427.556$ | $d_{11}=0.3$ | | |
| | $r_{12}=79.709$ | $d_{12}=12.5$ | $n_7=1.52$ | $\nu_7=70.1$ |
| | $r_{13}=337.201$ | $d_{13}=0.3$ | | |
| $f_2=114.8669$ | $r_{14}=55.199$ | $d_{14}=12.5$ | $n_8=1.52$ | $\nu_8=70.1$ |
| | $r_{15}=89.146$ | $d_{15}=10.8$ | | |
| | $r_{16}=457.998$ | $d_{16}=4.2$ | $n_9=1.80518$ | $\nu_9=25.5$ |
| | $r_{17}=47.719$ | $d_{17}=14.4$ | | |
| | $r_{18}=161.673$ | $d_{18}=10.5$ | $n_{10}=1.64831$ | $\nu_{10}=33.8$ |
| | $r_{19}=-151.051$ | | | |

| Embodiment 6 |
|---|
| $f = 100 - 137.404 - 190.975$ F/3.5 |
| $Bf = 118.757 - 144.577 - 181.577$ |

| | | | | |
|---|---|---|---|---|
| | $r_1 = 243.195$ | $d_1 = 22.8$ | $n_1 = 1.60311$ | $\nu_1 = 60.7$ |
| | $r_2 = -800.7$ | $d_2 = 1.9$ | | |
| | $r_3 = -3010.471$ | $d_3 = 4.2$ | $n_2 = 1.6968$ | $\nu_2 = 55.6$ |
| $f_1 = -166.3988$ | $r_4 = 67.127$ | $d_4 = 18.9$ | | |
| | $r_5 = 640.572$ | $d_5 = 4.2$ | $n_3 = 1.713$ | $\nu_3 = 53.9$ |
| | $r_6 = 165.485$ | $d_6 = 15.8$ | | |
| | $r_7 = 105.477$ | $d_7 = 10.8$ | $n_4 = 1.74077$ | $\nu_4 = 27.7$ |
| | $r_8 = 211.185$ | $d_8 = 91.158 \sim 39.1274 \sim 0.1063$ | | |
| | $r_9 = 198.813$ | $d_9 = 12.5$ | $n_5 = 1.52$ | $\nu_5 = 70.1$ |
| | $r_{10} = -294.505$ | $d_{10} = 0.3$ | | |
| | $r_{11} = 78.865$ | $d_{11} = 13.0$ | $n_6 = 1.52$ | $\nu_6 = 70.1$ |
| | $r_{12} = 449.942$ | $d_{12} = 0.3$ | | |
| | $r_{13} = 54.224$ | $d_{13} = 11.0$ | $n_7 = 1.52$ | $\nu_7 = 70.1$ |
| $f_2 = 114.8669$ | $r_{14} = 89.348$ | $d_{14} = 10.8$ | | |
| | $r_{15} = 443.432$ | $d_{15} = 4.2$ | $n_8 = 1.80518$ | $\nu_8 = 25.5$ |
| | $r_{16} = 47.494$ | $d_{16} = 16.6$ | | |
| | $r_{17} = 232.021$ | $d_{17} = 2.8$ | $n_9 = 1.6516$ | $\nu_9 = 58.5$ |
| | $r_{18} = 207.251$ | $d_{18} = 7.8$ | $n_{10} = 1.61293$ | $\nu_{10} = 36.9$ |
| | $r_{19} = -127.066$ | | | |

Figure 7:
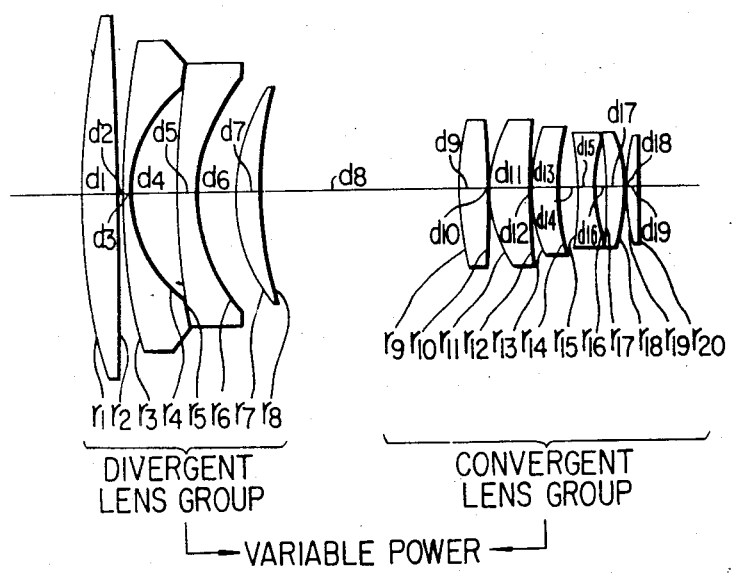
Figure 21:
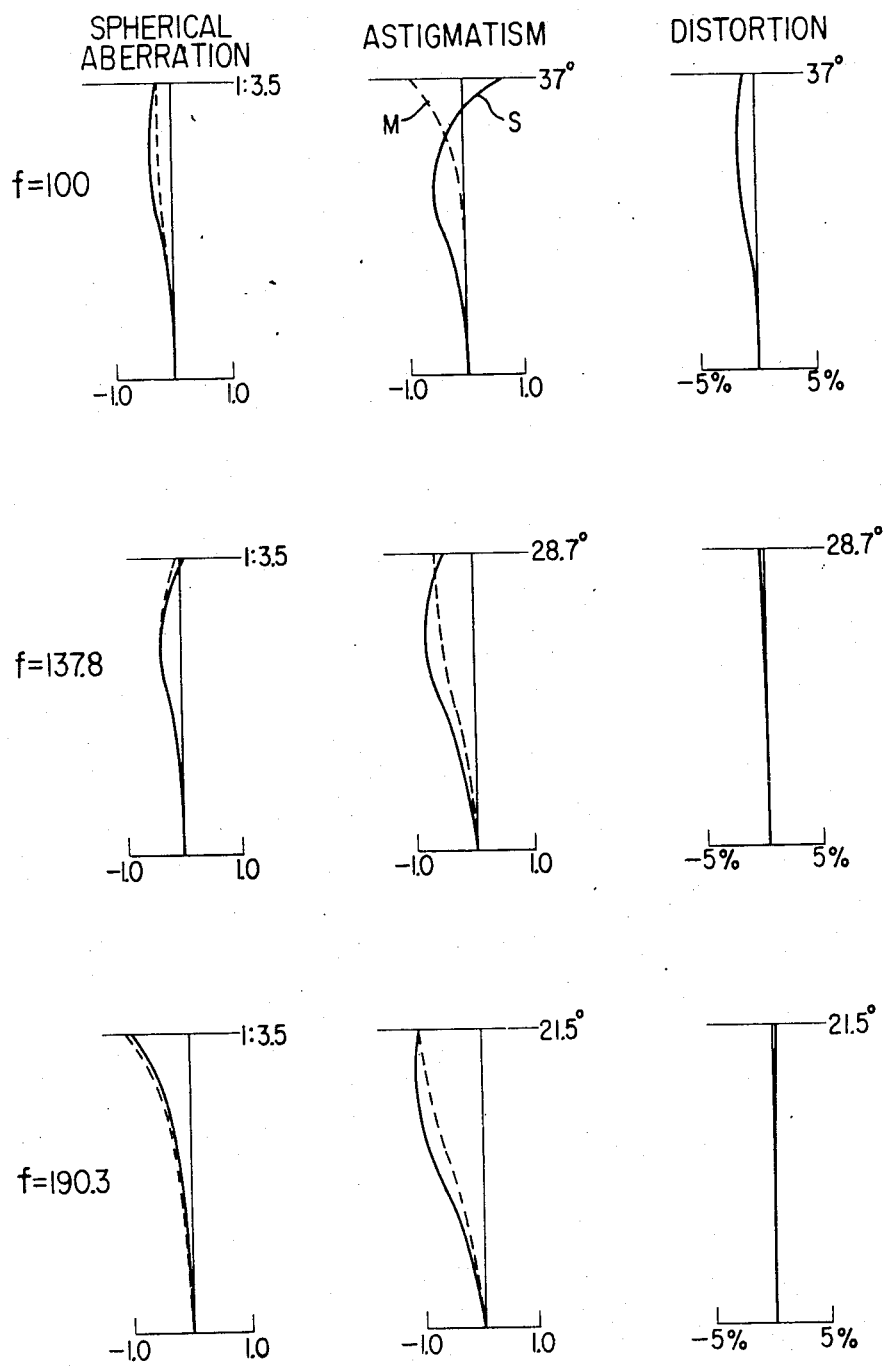

Embodiment 7 is a basic form of the lens system which has achieved a wider angle of view 74° by dividing the third positive component in Embodiment 1 into a positive meniscus lens convex toward the image side and a positive lens. The numerical data of the present embodiment will be shown below while the lens arrangement thereof is shown in FIG. 7 and the various aberrations therein under various focal length conditions are illustrated in FIG. 21.

Figure 8:
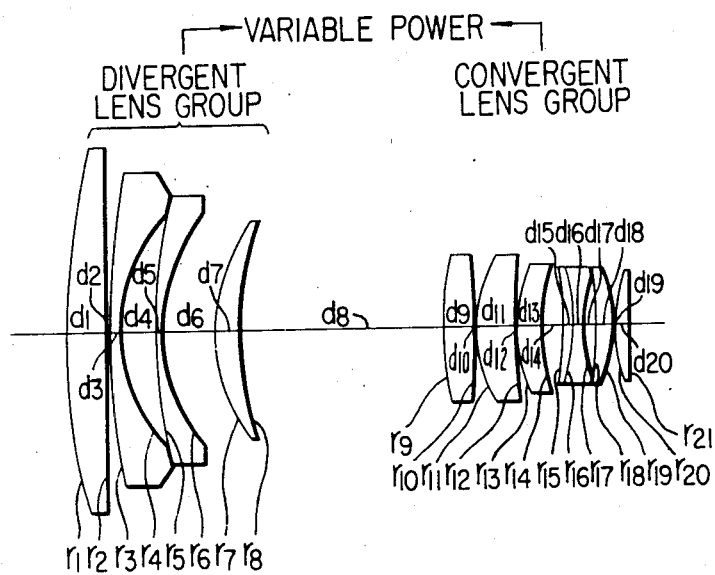

$\eta_P - \eta_N < 0.05$ and $\nu_P < \nu_N$, where $\eta_P$ and $\nu_P$ are the refractive index and the Abbe number of the positive lens in the double and $\eta_N$ and $\nu_N$ are the refractive index and the Abbe number of the negative lens in the doublet, whereby the color variation of the spherical aberration at the longest focal length side can be well corrected. The numerical data of the present embodiment will be shown below while the lens arrangement thereof is shown in FIG. 8 and the various aberrations therein

| Embodiment 7 |
|---|
| $f = 100 - 137.8 - 190.3$ |
| $Bf = 134.952 - 164.163 - 204.768$ |

| | | | | |
|---|---|---|---|---|
| | $r_1 = 418.897$ | $d_1 = 23.7$ | $\eta_1 = 1.51835$ | $\nu_1 = 60.3$ |
| | $r_2 = 5236.216$ | $d_2 = 1.4$ | $\eta_2 = 1.$ | |
| | $r_3 = 394.601$ | $d_3 = 5.2$ | $\eta_3 = 1.713$ | $\nu_2 = 53.9$ |
| | $r_4 = 87.135$ | $d_4 = 27.6$ | $\eta_4 = 1.$ | |
| $f_1 = -174.541$ | $r_5 = 436.517$ | $d_5 = 13.3$ | $\eta_5 = 1.713$ | $\nu_3 = 53.9$ |
| | $r_6 = 121.243$ | $d_6 = 22.3$ | $\eta_6 = 1.$ | |
| | $r_7 = 118.688$ | $d_7 = 14.7$ | $\eta_7 = 1.71736$ | $\nu_4 = 29.5$ |
| | $r_8 = 232.016$ | | $\eta_8 = 1.$ | |
| | | $d_8 = 119.0764 \sim 54.487 \sim 7.3048$ | | |
| | $r_9 = 179.533$ | $d_9 = 19.2$ | $\eta_9 = 1.52$ | $\nu_5 = 70.1$ |
| | $r_{10} = -1017.100$ | $d_{10} = 0.3$ | $\eta_{10} = 1.$ | |
| | $r_{11} = 83.779$ | $d_{11} = 25.1$ | $\eta_{11} = 1.52$ | $\nu_6 = 70.1$ |
| | $r_{12} = 527.112$ | $d_{12} = 0.3$ | $\eta_{12} = 1.$ | |
| | $r_{13} = 102.344$ | $d_{13} = 15.0$ | $\eta_{13} = 1.60729$ | $\nu_7 = 59.5$ |
| | $r_{14} = 144.606$ | $d_{14} = 12.6$ | $\eta_{14} = 1.$ | |
| $f_2 = 134.988$ | $r_{15} = -237.375$ | $d_{15} = 8.0$ | $\eta_{15} = 1.80518$ | $\nu_8 = 25.5$ |
| | $r_{16} = 76.798$ | $d_{16} = 8.4$ | $\eta_{16} = 1.$ | |
| | $r_{17} = 446.359$ | $d_{17} = 12.2$ | $\eta_{17} = 1.59551$ | $\nu_9 = 39.2$ |
| | $r_{18} = -103.649$ | $d_{18} = 0.3$ | $\eta_{18} = 1.$ | |
| | $r_{19} = 163.810$ | $d_{19} = 7.7$ | $\eta_{19} = 1.62606$ | $\nu_{10} = 39.1$ |
| | $r_{20} = -742.982$ | | | |

Figure 22:
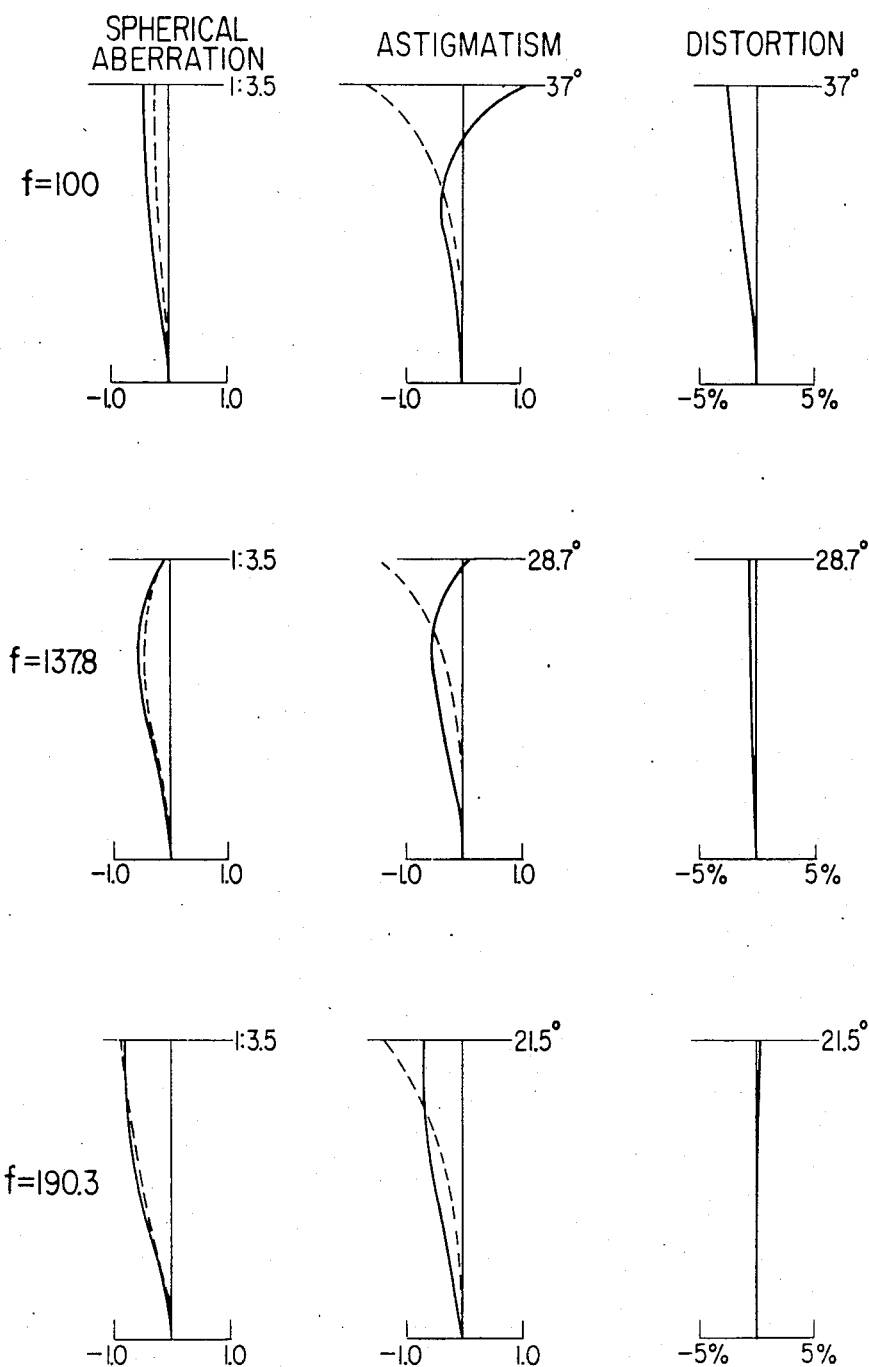

Embodiment 8 is one which employs a doublet as the third negative component and satisfies the relations that under various focal length conditions are illustrated in FIG. 22.

| Embodiment 8 |
|---|
| $f = 100 - 137.777 - 190.291$ |
| $Bf = 132.526 - 161.737 - 202.342$ |

| | | | | |
|---|---|---|---|---|
| | $r_1 = 406.33$ | $d_1 = 24.8$ | $\eta_1 = 1.59507$ | $\nu_1 = 35.6$ |
| | $r_2 = 17519.192$ | $d_2 = 2.1$ | $\eta_2 = 1.$ | |
| | $r_3 = 464.264$ | $d_3 = 4.5$ | $\eta_3 = 1.713$ | $\nu_2 = 53.9$ |
| | $r_4 = 88.368$ | $d_4 = 23.4$ | $\eta_4 = 1.$ | |
| $f_1 = -174.541$ | $r_5 = 332.849$ | $d_5 = 4.2$ | $\eta_5 = 1.713$ | $\nu_3 = 53.9$ |
| | $r_6 = 120.856$ | $d_6 = 32.1$ | $\eta_6 = 1.$ | |
| | $r_7 = 119.483$ | $d_7 = 14.7$ | $\eta_7 = 1.68893$ | $\nu_4 = 31.1$ |
| | $r_8 = 203.329$ | | $\eta_8 = 1.$ | |
| | | $d_8 = 114.3882 \sim 49.7987 \sim 2.61650$ | | |
| | $r_9 = 193.841$ | $d_9 = 19.2$ | $\eta_9 = 1.50032$ | $\nu_5 = 81.9$ |

-continued

| Embodiment 8 |||||
|---|---|---|---|---|
| f=100—137.777—190.291 |||||
| Bf=132.526—161.737—202.342 |||||
|  | $r_{10}=-644.406$ | $d_{10}=0.3$ | $\eta_{10}=1.$ |  |
|  | $r_{11}=82.586$ | $d_{11}=25.1$ | $\eta_{11}=1.50032$ | $\nu_6=81.9$ |
|  | $r_{12}=663.254$ | $d_{12}=0.3$ | $\eta_{12}=1.$ |  |
|  | $r_{13}=88.963$ | $d_{13}=15.0$ | $\eta_{13}=1.51833$ | $\nu_7=59.0$ |
|  | $r_{14}=128.497$ | $d_{14}=12.6$ | $\eta_{14}=1.$ |  |
| $f_2=134.988$ | $r_{15}=-210.147$ | $d_{15}=5.9$ | $\eta_{15}=1.80518$ | $\nu_8=25.5$ |
|  | $r_{16}=-104.724$ | $d_{16}=2.8$ | $\eta_{16}=1.74$ | $\nu_9=28.2$ |
|  | $r_{17}=69.816$ | $d_{17}=8.7$ | $\eta_{17}=1.$ |  |
|  | $r_{18}=-233.727$ | $d_{18}=11.0$ | $\eta_{18}=1.50137$ | $\nu_{10}=56.5$ |
|  | $r_{19}=-80.834$ | $d_{19}=0.3$ | $\eta_{19}=1.$ |  |
|  | $r_{20}=120.289$ | $d_{20}=9.4$ | $\eta_{20}=1.59507$ | $\nu_{11}=35.6$ |
|  | $r_{21}=2627.557$ |  |  |  |

Figure 9:
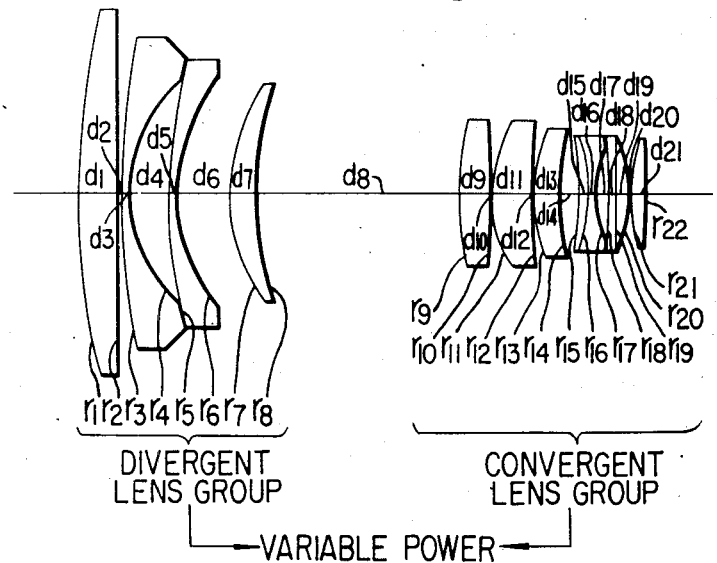
Figure 23:
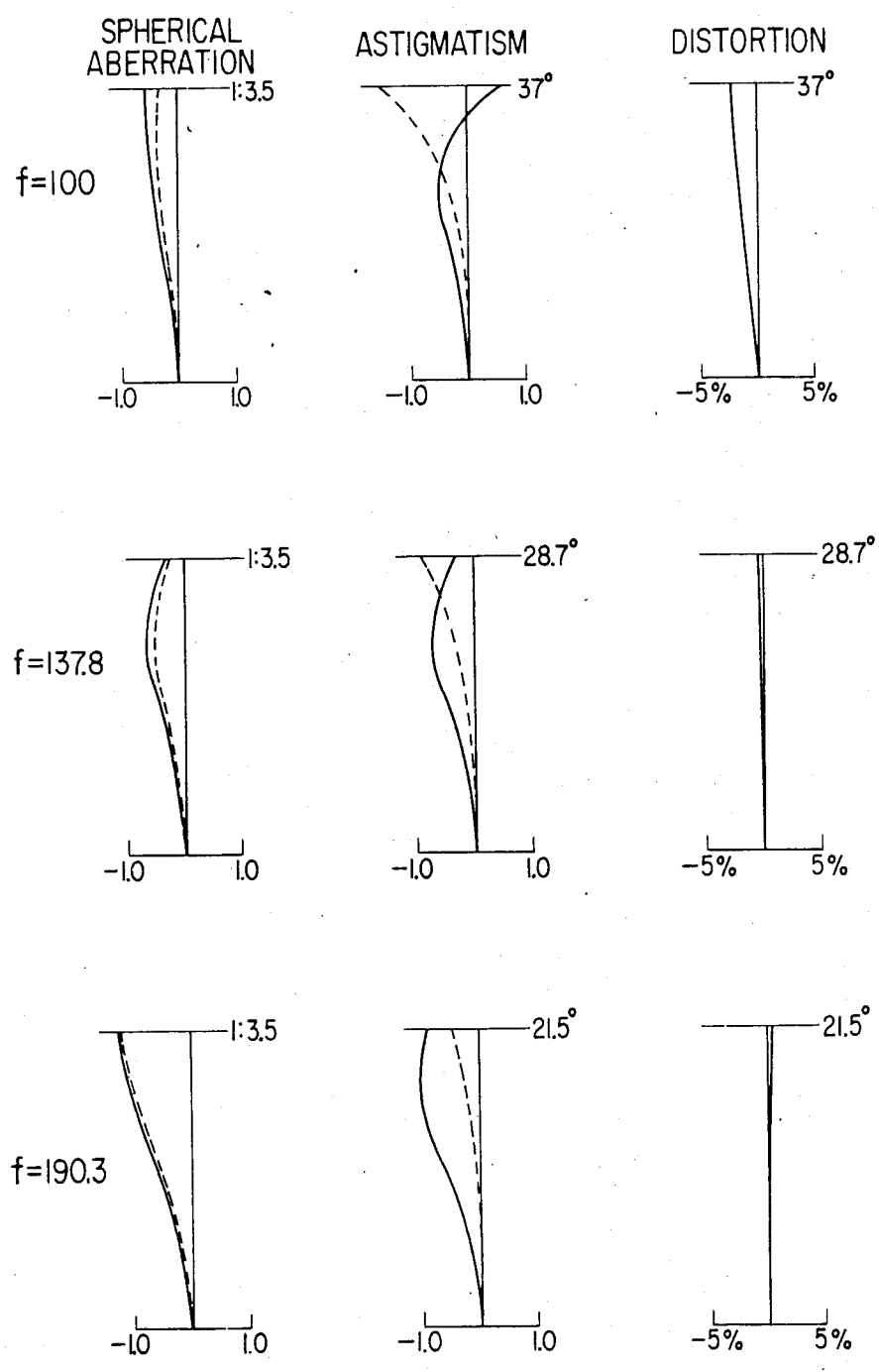
Figure 24:
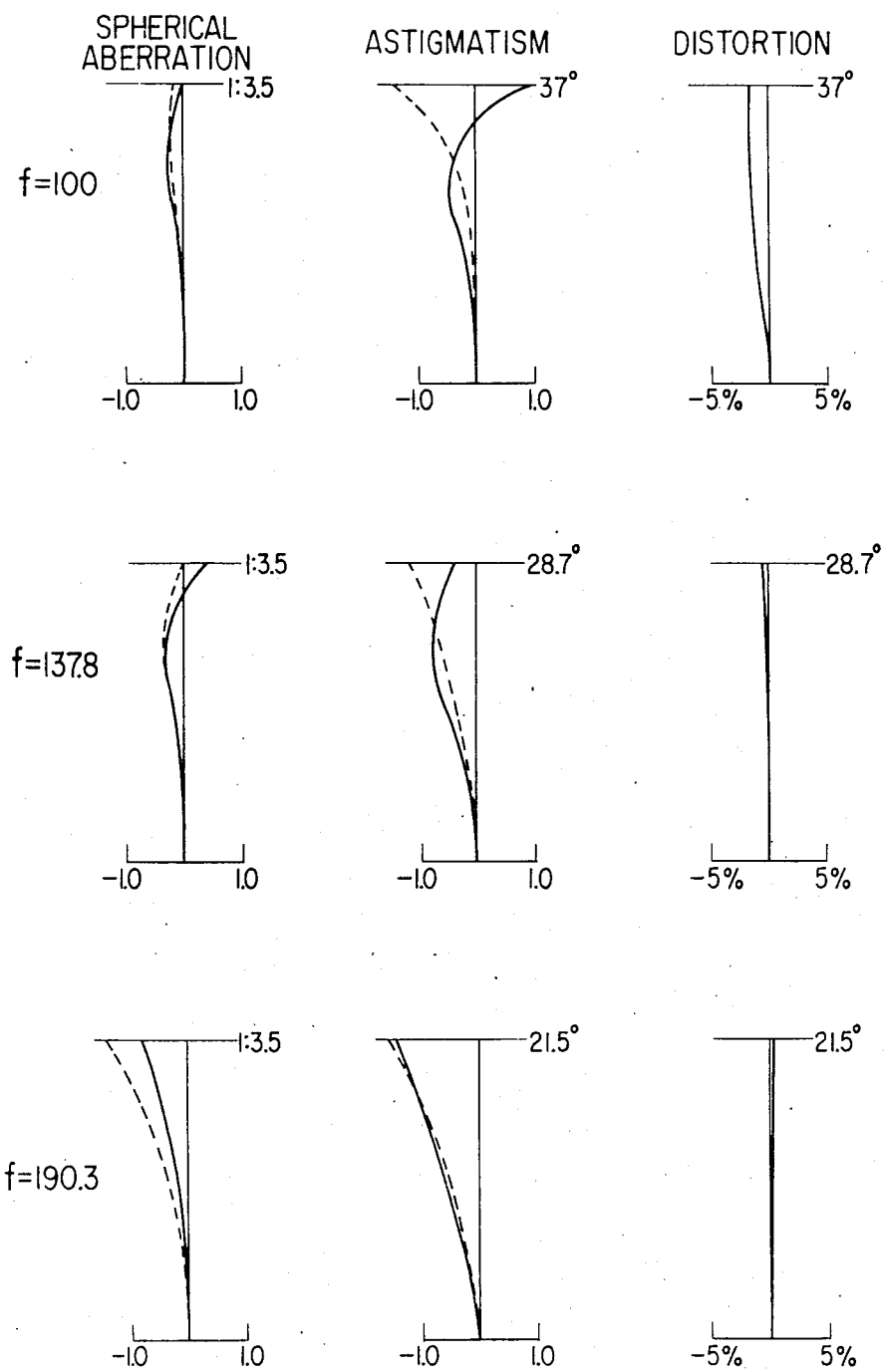

Embodiment 9 employs a doublet as the positive meniscus lens which is divided in Embodiment 7, and is convex toward the image side, and chooses a small refractive index for the positive lens in the doublet and a great refractive index for the negative lens in the doublet, whereby the Petzval sum is well corrected. The numerical data of the present embodiment will be shown below while the lens arrangement thereof is shown in FIG. 9 and the various aberrations therein under various focal length conditions are illustrated in FIG. 23.

Figure 10:
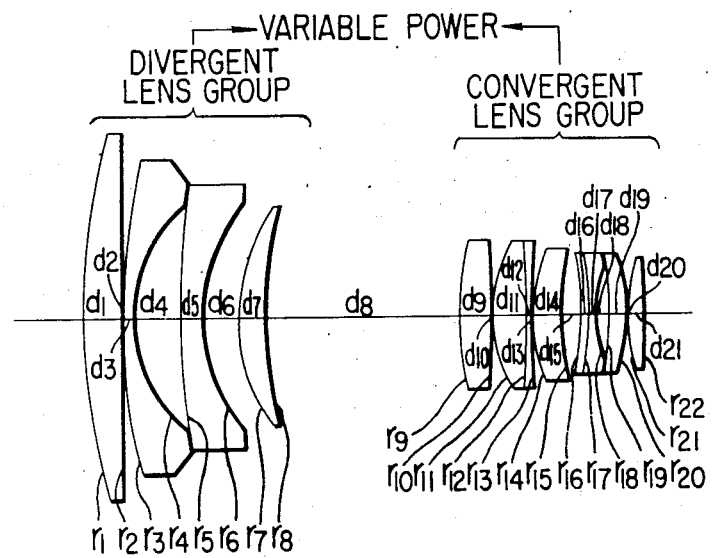

Embodiment 10 employs a doublet as the second positive meniscus component to thereby correct the axial chromatic aberration easier and reduce the duty of the other component for correction of the chromatic aberration, thereby aberrations are well corrected as a whole. Further, this embodiment satisfies the same conditions and has the same effect as Embodiment 8. The numerical data of the present embodiment will be shown below while the lens arrangement thereof is shown in FIG. 10 and the various aberrations therein under various focal length conditions are illustrated in

| Embodiment 9 |||||
|---|---|---|---|---|
| f=100—137.78—190.29 |||||
| Bf=131.128—160.339—200.945 |||||
|  | $r_1=427.624$ | $d_1=24.8$ | $\eta_1=1.5907$ | $\nu_1=35.6$ |
|  | $r_2=17519.167$ | $d_2=2.1$ | $\eta_2=1.$ |  |
|  | $r_3=443.261$ | $d_3=4.5$ | $\eta_3=1.713$ | $\nu_2=53.9$ |
|  | $r_4=88.368$ | $d_4=23.4$ | $\eta_4=1.$ |  |
| $f_1=-174.541$ | $r_5=332.849$ | $d_5=4.2$ | $\eta_5=1.713$ | $\nu_3=53.9$ |
|  | $r_6=120.856$ | $d_6=32.1$ | $\eta_6=1.$ |  |
|  | $r_7=119.483$ | $d_7=14.7$ | $\eta_7=1.67270$ | $\nu_4=32.2$ |
|  | $r_8=207.558$ |  | $\eta_8=1.$ |  |
|  |  | $d_8=114.2727\sim49.6832\sim2.5010$ |  |  |
|  | $r_9=193.841$ | $d_9=19.2$ | $\eta_9=1.50032$ | $\nu_5=81.9$ |
|  | $r_{10}=-644.061$ | $d_{10}=3.5$ | $\eta_{10}=1.$ |  |
|  | $r_{11}=82.586$ | $d_{11}=25.1$ | $\eta_{11}=1.50032$ | $\nu_6=81.9$ |
|  | $r_{12}=663.254$ | $d_{12}=3.5$ | $\eta_{12}=1.$ |  |
|  | $r_{13}=95.578$ | $d_{13}=15.0$ | $\eta_{13}=1.51118$ | $\nu_7=50.9$ |
|  | $r_{14}=173.745$ | $d_{14}=12.6$ | $\eta_{14}=1.$ |  |
|  | $r_{15}=-201.126$ | $d_{15}=5.9$ | $\eta_{15}=1.80518$ | $\nu_8=25.5$ |
| $f_2=134.988$ | $r_{16}=-104.724$ | $d_{16}=2.8$ | $\eta_{16}=1.74$ | $\nu_9=28.2$ |
|  | $r_{17}=69.816$ | $d_{17}=8.7$ | $\eta_{17}=1.$ |  |
|  | $r_{18}=-338.609$ | $d_{18}=4.2$ | $\eta_{18}=1.67790$ | $\nu_{10}=55.5$ |
|  | $r_{19}=837.795$ | $d_{19}=8.7$ | $\eta_{19}=1.59507$ | $\nu_{11}=56.5$ |
|  | $r_{20}=-79.565$ | $d_{20}=3.5$ | $\eta_{20}=1.$ |  |
|  | $r_{21}=125.025$ | $d_{21}=9.4$ | $\eta_{21}=1.59507$ | $\nu_{12}=35.6$ |
|  | $r_{22}=1151.140$ |  | $\eta_{22}=1.$ |  |

FIG. 24.

| Embodiment 10 |||||
|---|---|---|---|---|
| f=100—137.8—190.3 |||||
| Bf=134.829—164.039—204.645 |||||
|  | $r_1=366.919$ | $d_1=23.7$ | $\eta_1=1.60311$ | $\nu_1=60.7$ |
|  | $r_2=9892.783$ | $d_2=1.4$ | $\eta_2=1.$ |  |
|  | $r_3=446.126$ | $d_3=5.2$ | $\eta_3=1.713$ | $\nu_2=53.9$ |
|  | $r_4=86.883$ | $d_4=27.6$ | $\eta_4=1.$ |  |
| $f_1=-174.541$ | $r_5=457.296$ | $d_5=13.3$ | $\eta_5=1.713$ | $\nu_3=53.9$ |
|  | $r_6=120.826$ | $d_6=22.3$ | $\eta_6=1.$ |  |
|  | $r_7=117.621$ | $d_7=14.7$ | $\eta_7=1.68893$ | $\nu_4=31.1$ |
|  | $r_8=239.700$ |  | $\eta_8=1.$ |  |
|  |  | $d_8=118.0228\sim53.4333\sim6.2511$ |  |  |
|  | $r_9=179.532$ | $d_9=19.2$ | $\eta_9=1.52$ | $\nu_5=70.1$ |
|  | $r_{10}=-1012.684$ | $d_{10}=0.3$ | $\eta_{10}=1.$ |  |
|  | $r_{11}=83.430$ | $d_{11}=20.9$ | $\eta_{11}=1.52$ | $\nu_6=70.1$ |
| $f_2=134.988$ | $r_{12}=-698.162$ | $d_{12}=4.2$ | $\eta_{12}=1.68893$ | $\nu_7=31.1$ |
|  | $r_{13}=991.505$ | $d_{13}=0.3$ | $\eta_{13}=1.$ |  |

-continued

Embodiment 10
f = 100 − 137.8 − 190.3
Bf = 134.829 − 164.039 − 204.645

|  |  |  |  |  |
|---|---|---|---|---|
|  | $r_{14}=102.344$ | $d_{14}=15.0$ | $\eta_{14}=1.58144$ | $\nu_8=40.8$ |
|  | $r_{15}=149.038$ | $d_{15}=12.6$ | $\eta_{15}=1.$ |  |
|  | $r_{16}=-214.336$ | $d_{16}=5.2$ | $\eta_{16}=1.80518$ | $\nu_9=25.5$ |
|  | $r_{17}=-166.351$ | $d_{17}=2.8$ | $\eta_{17}=1.74$ | $\nu_{10}=28.2$ |
| $f_2=134.988$ | $r_{18}=72.853$ | $d_{18}=7.0$ | $\eta_{18}=1.$ |  |
|  | $r_{19}=-260.065$ | $d_{19}=12.2$ | $\eta_{19}=1.50137$ | $\nu_{11}=56.5$ |
|  | $r_{20}=-94.95$ | $d_{20}=0.3$ | $\eta_{20}=1.$ |  |
|  | $r_{21}=156.004$ | $d_{21}=7.7$ | $\eta_{21}=1.62606$ | $\nu_{12}=39.1$ |
|  | $r_{22}=-475.602$ |  | $\eta_{22}=1.$ |  |

Figure 11:
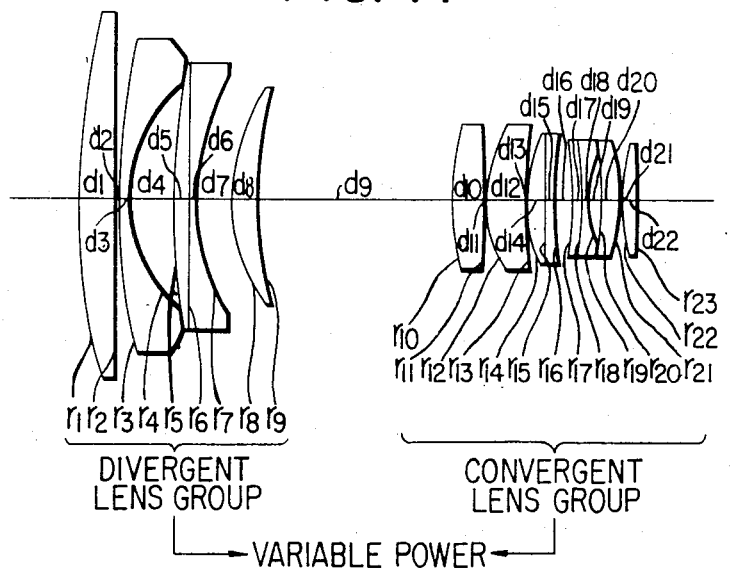
Figure 25:
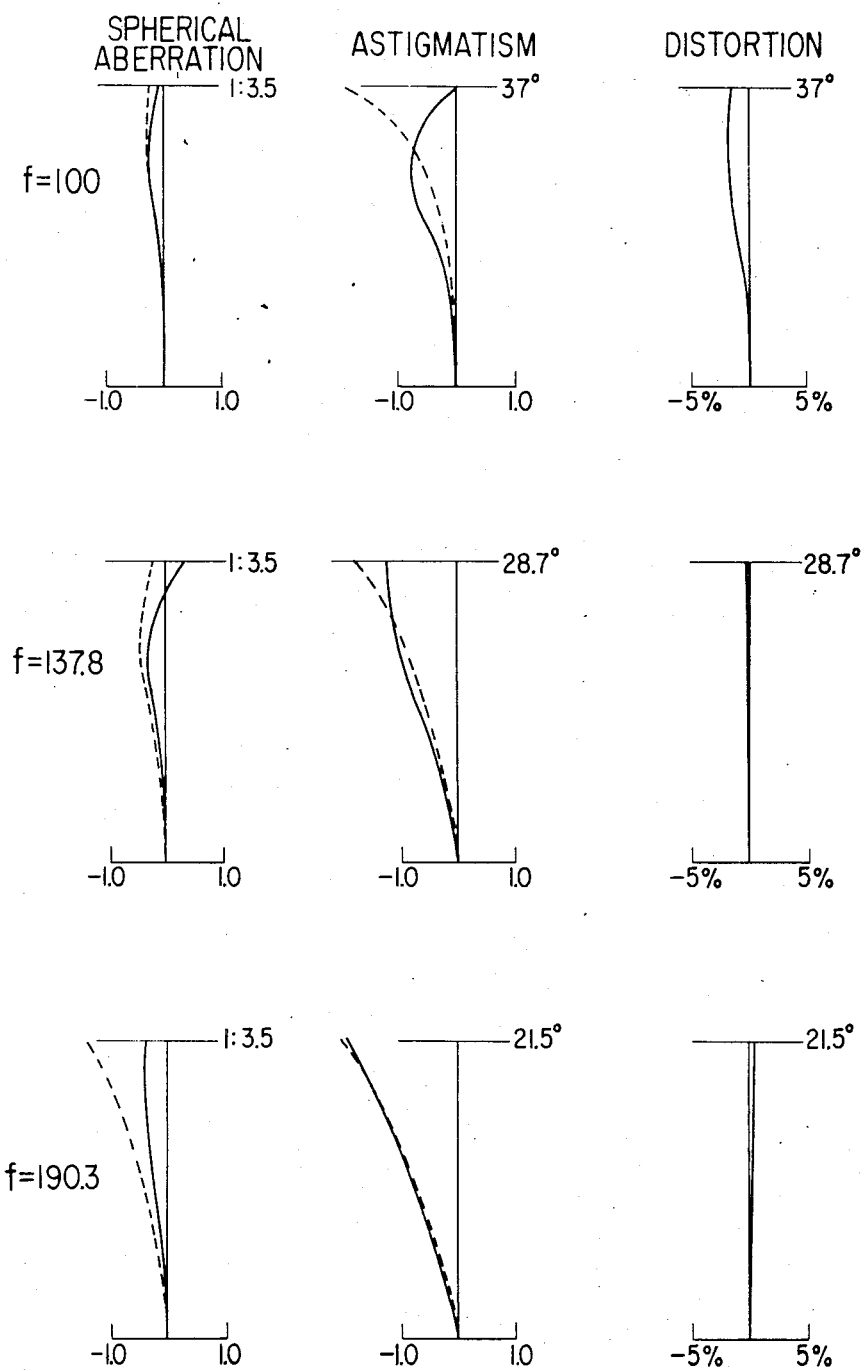

Embodiment 11 employs a doublet as the third positive meniscus component to thereby correct the axial chromatic aberration easier and employs a doublet as the second negative component to achieve the same effect as in Embodiment 4, and satisfies the same conditions as Embodiment 8 to maintain a good balance between the various aberrations. The numerical data of the present embodiment will be shown below while the lens arrangement thereof is shown in FIG. 11 and the various aberrations therein under various focal length conditions are illustrated in FIG. 25.

Figure 12:
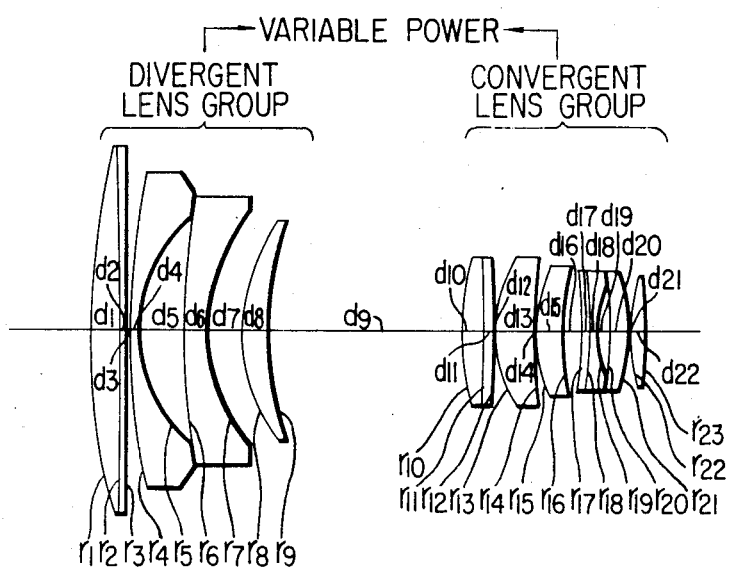

Embodiment 12 employs a doublet as the first positive component to permit the apparent Abbe number to be further greater and thereby contribute to a high degree of correction of the chromatic aberration. Further, as Embodiment 3, the present embodiment employs a doublet as the second positive component to achieve the same effect and satisfies the same conditions, as Embodiment 8 to maintain a good balance between the various aberrations. The numerical data of the present embodiment will be shown below while the lens arrangement thereof is shown in FIG. 12 and the Embodiment 11
f = 100 − 137.8 − 190.3
Bf = 134.301 − 163.512 − 204.118

Figure 26:
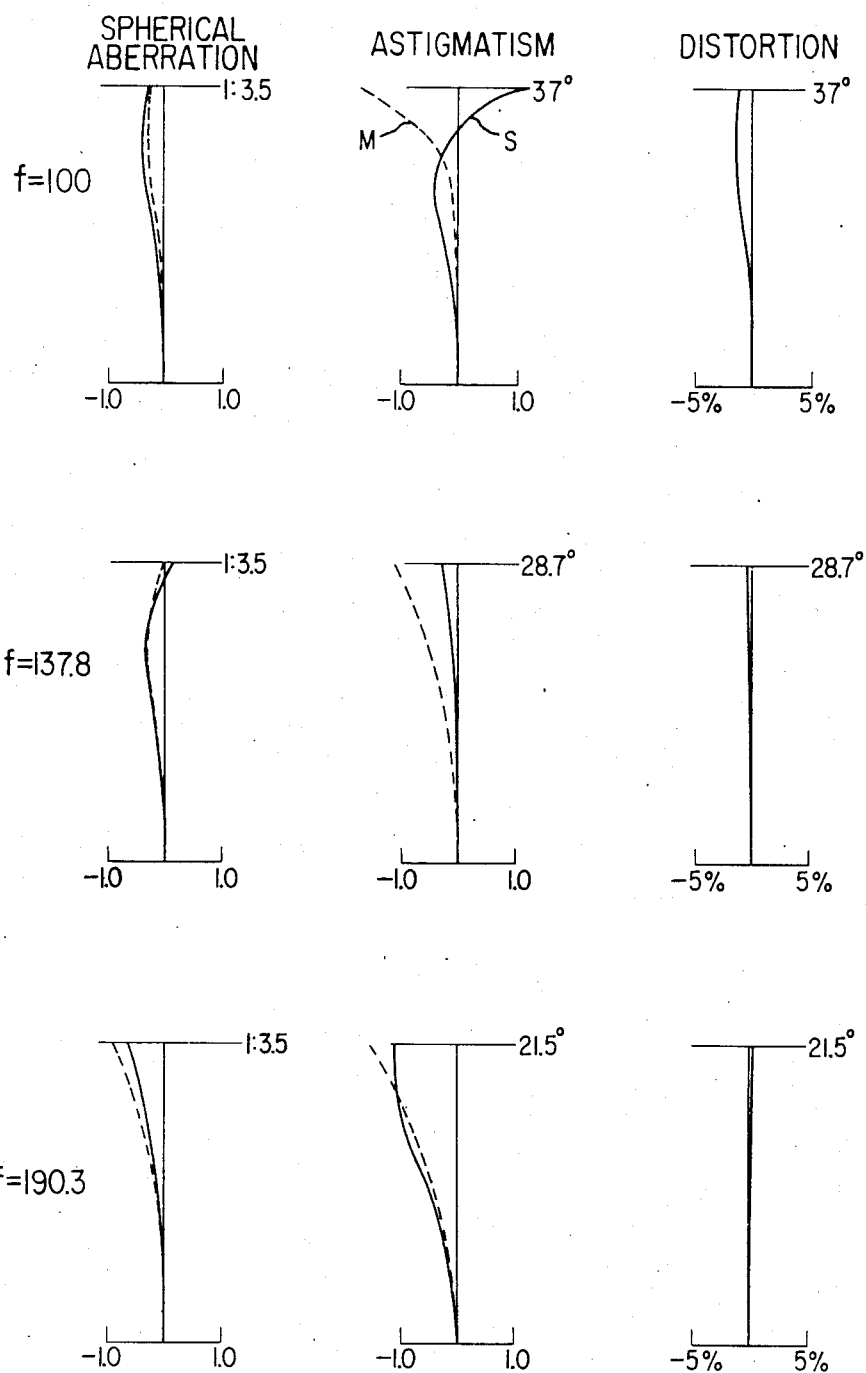

|  |  |  |  |  |
|---|---|---|---|---|
|  | $r_1=366.919$ | $d_1=23.7$ | $\eta_1=1.60311$ | $\nu_1=60.7$ |
|  | $r_2=9892.783$ | $d_2=1.4$ | $\eta_2=1.$ |  |
|  | $r_3=446.126$ | $d_3=5.2$ | $\eta_3=1.713$ | $\nu_2=53.9$ |
|  | $r_4=86.883$ | $d_4=27.6$ | $\eta_4=1.$ |  |
| $f_1=-174.541$ | $r_5=436.547$ | $d_5=9.8$ | $\eta_5=1.64831$ | $\nu_3=33.8$ |
|  | $r_6=2683.735$ | $d_6=3.5$ | $\eta_6=1.713$ | $\nu_4=53.9$ |
|  | $r_7=123.569$ | $d_7=22.3$ | $\eta_7=1.$ |  |
|  | $r_8=118.688$ | $d_8=14.7$ | $\eta_8=1.64831$ | $\nu_5=33.8$ |
|  | $r_9=255.510$ |  | $\eta_9=1.$ |  |
|  |  | $d_9=118.4759\sim53.8864\sim6.7043$ |  |  |
|  | $r_{10}=179.532$ | $d_{10}=19.2$ | $\eta_{10}=1.52$ | $\nu_6=70.1$ |
|  | $r_{11}=-1117.059$ | $d_{11}=0.3$ | $\eta_{11}=1.$ |  |
| $f_2=134.988$ | $r_{12}=83.430$ | $d_{12}=25.1$ | $\eta_{12}=1.53172$ | $\nu_7=48.9$ |
|  | $r_{13}=523.622$ | $d_{13}=0.3$ | $\eta_{13}=1.$ |  |
|  | $r_{14}=105.008$ | $d_{15}=11.5$ | $\eta_{14}=1.52$ | $\nu_8=70.1$ |
|  | $r_{15}=-3490.811$ | $d_{15}=3.5$ | $\eta_{15}=1.68893$ | $\nu_9=31.1$ |
|  | $r_{16}=236.160$ | $d_{16}=12.6$ | $\eta_{16}=1.$ |  |
|  | $r_{17}=-219.921$ | $d_{17}=5.2$ | $\eta_{17}=1.80518$ | $\nu_{10}=25.5$ |
|  | $r_{18}=-166.351$ | $d_{18}=2.8$ | $\eta_{18}=1.74$ | $\nu_{11}=28.2$ |
| $f_2=134.988$ | $r_{19}=72.853$ | $d_{19}=8.4$ | $\eta_{19}=1.$ |  |
|  | $r_{20}=-260.065$ | $d_{20}=12.2$ | $\eta_{20}=1.50137$ | $\nu_{12}=56.5$ |
|  | $r_{21}=-94.950$ | $d_{21}=0.3$ | $\eta_{21}=1.$ |  |
|  | $r_{22}=156.004$ | $d_{22}=7.7$ | $\eta_{22}=1.62606$ | $\nu_{13}=39.1$ |
|  | $r_{23}=-578.679$ |  | $\eta_{23}=1.$ |  | various aberrations therein under various focal length conditions are illustrated in FIG. 26.

Embodiment 12
f = 100 − 137.8 − 190.3
Bf = 134.810 − 164.021 − 204.626

|  |  |  |  |  |
|---|---|---|---|---|
|  | $r_1=383.989$ | $d_1=20.2$ | $\eta_1=1.60311$ | $\nu_1=60.7$ |
|  | $r_2=3490.811$ | $d_2=3.5$ | $\eta_2=1.64831$ | $\nu_2=33.8$ |
|  | $r_3=\infty$ | $d_3=1.4$ | $\eta_3=1.$ |  |
|  | $r_4=446.126$ | $d_4=5.2$ | $\eta_4=1.713$ | $\nu_3=53.9$ |
| $f_1=-174.541$ | $r_5=86.883$ | $d_5=27.6$ | $\eta_5=1.$ |  |
|  | $r_6=436.547$ | $d_6=13.3$ | $\eta_6=1.713$ | $\nu_4=53.9$ |
|  | $r_7=121.240$ | $d_7=22.3$ | $\eta_7=1.$ |  |
|  | $r_8=118.688$ | $d_8=14.7$ | $\eta_8=1.7552$ | $\nu_5=77.5$ |
|  | $r_9=219.240$ |  | $\eta_9=1.$ |  |
|  |  | $d_9=118.1950\sim53.6056\sim6.4234$ |  |  |
|  | $r_{10}=179.532$ | $d_{10}=14.0$ | $\eta_{10}=1.52$ | $\nu_6=70.1$ |
|  | $r_{11}=-691.181$ | $d_{11}=5.2$ | $\eta_{11}=1.68893$ | $\nu_7=31.1$ |
|  | $r_{12}=-910.239$ | $d_{12}=0.3$ | $\eta_{12}=1.$ |  |
|  | $r_{13}=83.43$ | $d_{13}=25.1$ | $\eta_{13}=1.52$ | $\nu_8=70.1$ |
|  | $r_{14}=522.516$ | $d_{14}=0.3$ | $\eta_{14}=1.$ |  |

-continued

| | Embodiment 12 f=100−137.8−190.3 Bf=134.810−164.021−204.626 | | | |
|---|---|---|---|---|
| $f_2=134.988$ | $r_{15}=102.344$ | $d_{15}=15.0$ | $\eta_{15}=1.52$ | $\nu_9=70.1$ |
| | $r_{16}=162.916$ | $d_{16}=12.6$ | $\eta_{16}=1.$ | |
| | $r_{17}=-212.311$ | $d_{17}=5.2$ | $\eta_{17}=1.80518$ | $\nu_{10}=25.5$ |
| | $r_{18}=-166.351$ | $d_{18}2.8$ | $\eta_{18}=1.74$ | $\nu_{11}=28.2$ |
| | $r_{19}=72.853$ | $d_{19}=8.4$ | $\eta_{19}=1.$ | |
| | $r_{20}=-260.065$ | $d_{20}=12.2$ | $\eta_{20}=1.50137$ | $\nu_{12}=56.5$ |
| | $r_{21}=-94.950$ | $d_{21}=0.3$ | $\eta_{21}=1.$ | |
| | $r_{22}=156.004$ | $d_{22}=7.7$ | $\eta_{22}=1.62606$ | $\nu_{13}=39.1$ |
| | $r_{23}=-446.049$ | | $\eta_{23}=1.$ | |

Figure 27:
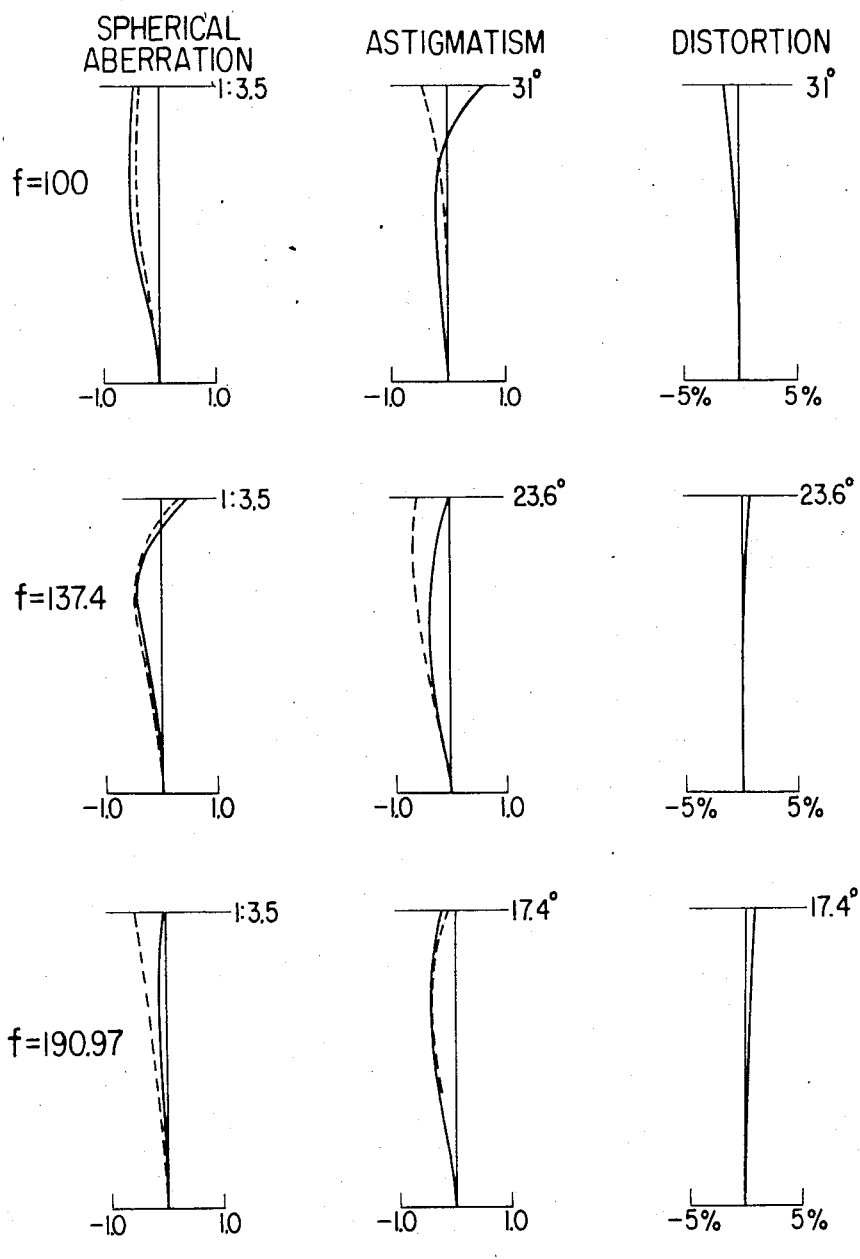

Embodiment 13 is a basic form of the wide-angle zoom lens system which covers an angle of view 62° and which is smaller in size than in the preceding embodiments by eliminating one of the second and the third positive meniscus components and dividing the third positive component in Embodiment 1 into a positive meniscus lens convex toward the image side and a positive lens. The numerical data of the present embodiment will be shown below while the lens arrangement thereof is shown in FIG. 13 and the various aberrations therein under various focal length conditions are illustrated in FIG. 27.

Figure 28:
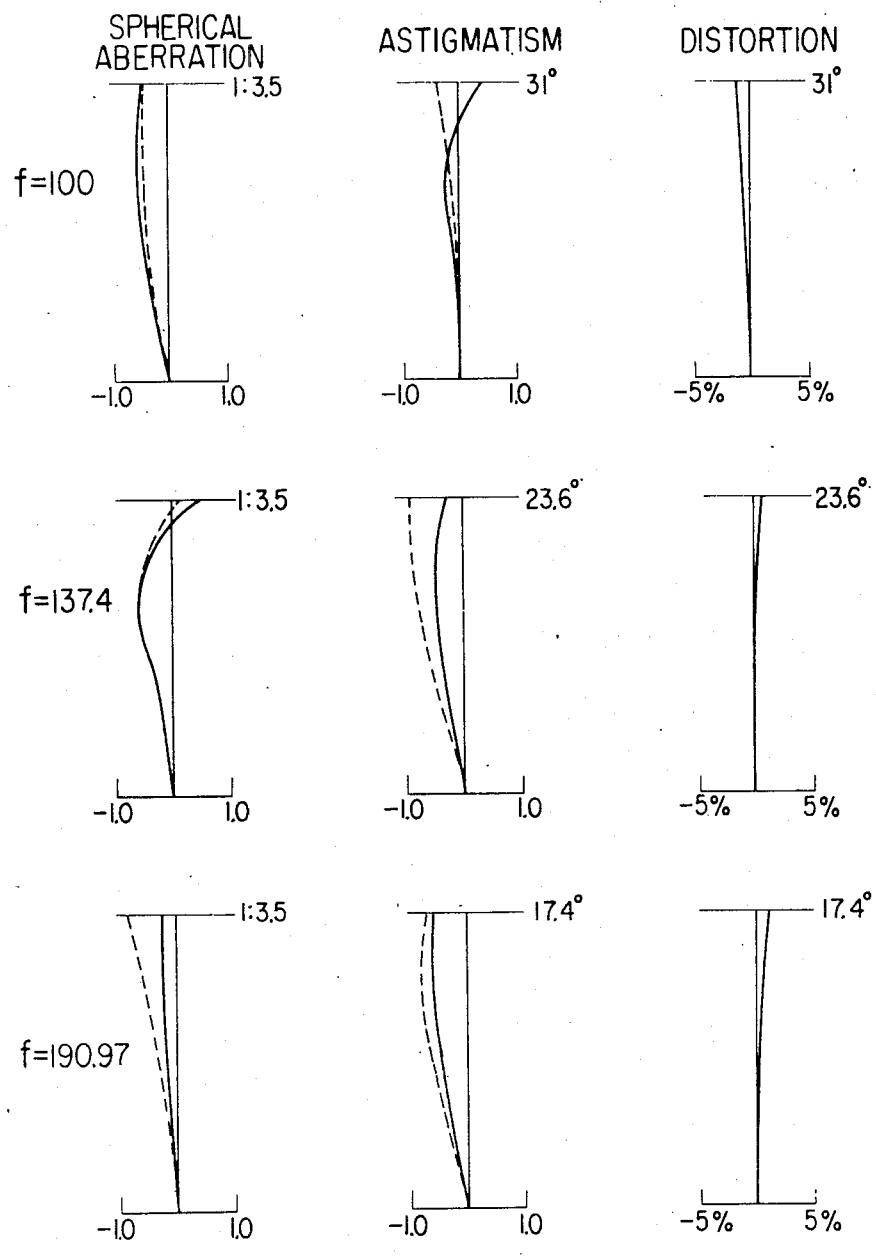

Embodiment 14 employs a doublet as the third negative component to satisfy the same condition and achieve the same effect as in Embodiment 8, and employs a doublet as the second positive component to correct unbalance of chromatic aberration caused by employment of the doublet as the third negative component. The numerical data of the present embodiment will be shown below while the lens arrangement thereof is shown in FIG. 14 and the various aberrations therein under various focal length conditions are illustrated in FIG. 28.

| | Embodiment 13 f=100−137.40−190.97, F/3.5 Bf−120.91−146.73−183.71 | | | |
|---|---|---|---|---|
| | $r_1=121.861$ | $d_1=22.76$ | $\eta_1=1.60311$ | $\nu_1=60.7$ |
| | $r_3=862.970$ | $d_2=1.94$ | | |
| | $r_3=450.452$ | $d_3=4.16$ | $\eta_2=1.6968$ | $\nu_2=55.6$ |
| $f_1=-166.39$ | $r_4=63.915$ | $d_4=17.95$ | | |
| | $r_5=458.957$ | $d_5=4.16$ | $\eta_3=1.71342$ | $\nu_3=53.9$ |
| | $r_6=96.595$ | $d_6=21.89$ | | |
| | $r_7=93.687$ | $d_7=10.83$ | $\eta_4=1.69896$ | $\nu_4=30.0$ |
| | $r_8=167.216$ | $d_8=93.53\sim41.50\sim2.48$ | | |
| | $r_9=107.864$ | $d_9=23.87$ | $\eta_5=1.62041$ | $\nu_5=60.3$ |
| | $r_{10}=-436.728$ | $d_{10}=6.94$ | | |
| | $r_{11}=59.746$ | $d_{11}=13.07$ | $\eta_6=1.62041$ | $\nu_6=60.3$ |
| | $r_{12}=179.704$ | $d_{12}=7.43$ | | |
| $f_2=114.87$ | $r_{13}=-345.071$ | $d_{13}=13.08$ | $\eta_7=1.80518$ | $\nu_7=25.5$ |
| | $r_{14}=57.356$ | $d_{14}=9.19$ | | |
| | $r_{15}=-140.893$ | $d_{15}=8.01$ | $\eta_8=1.62588$ | $\nu_8=35.6$ |
| | $r_{16}=73.702$ | $d_{16}=0.28$ | | |
| | $r_{17}=114.682$ | $d_{17}=8.40$ | $\eta_9=1.62588$ | $\nu_9=35.6$ |
| | $r_{18}=951.608$ | | | |

| | Embodiment 14 f=100−137.40−190.97, F/3.5 Bf−121.01−146.83−183.81 | | | |
|---|---|---|---|---|
| | $r_1=122.527$ | $d_1=22.76$ | $\eta_1=1.60311$ | $\nu_1=60.7$ |
| | $r_2=834.331$ | $d_2=1.94$ | | |
| | $r_3=428.800$ | $d_3=4.16$ | $\eta_2=1.6968$ | $\nu_2=55.6$ |
| $f_1=-166.39$ | $r_4=63.108$ | $d_4=18.36$ | | |
| | $r_5=513.233$ | $d_5=4.16$ | $\eta_3=1.713142$ | $\nu_3=53.9$ |
| | $r_6=93.410$ | $d_6=18.72$ | | |
| | $r_7=92.280$ | $d_7=10.83$ | $\eta_4=1.69895$ | $\nu_4=30.0$ |
| | $r_8=184.992$ | $d_8=96.316\sim44.285\sim5.264$ | | |
| | $r_9=104.729$ | $d_9=19.71$ | $\eta_5=1.62041$ | $\nu_5=60.3$ |
| | $r_{10}=-124.514$ | $d_{10}=3.70$ | $\eta_6=1.62004$ | $\nu_6=36.3$ |
| | $r_{11}=-503.795$ | $d_{11}=6.94$ | | |
| | $r_{12}=57.902$ | $d_{12}=14.1$ | $\eta_7=1.5168$ | $\nu_7=64.2$ |
| $f_2=114.87$ | $r_{13}=249.004$ | $d_{13}=7.42$ | | |
| | $r_{14}=-241.908$ | $d_{14}=9.37$ | $\eta_8=1.80518$ | $\nu_8=25.5$ |
| | $r_{15}=-184.314$ | $d_{15}=2.78$ | $\eta_9=1.72825$ | $\nu_9=28.3$ |
| | $r_{16}=56.464$ | $d_{16}=8.78$ | | |
| | $r_{17}=-199.298$ | $d_{17}=8.66$ | $\eta_{10}=1.62588$ | $\nu_{10}=35.6$ |
| | $r_{18}=-78.755$ | $d_{18}=0.28$ | | |
| | $r_{19}=103.430$ | $d_{19}=7.96$ | $\eta_{11}=1.62588$ | $\nu_{11}=35.6$ |
| | $r_{20}=295.655$ | | | |

In order to show that the Embodiments above stated meet the previously indicated significant conditions, the ratio of focal length and shape factor of each lens component are indicated for each embodiment by the following Tables.

| | Embodiments of Type I | | | | | |
|---|---|---|---|---|---|---|
| | 1 | 2 | 3 | 4 | 5 | 6 |
| $f_{11}/|f_1|$ | 1.87 | 2.63 | 1.62 | 1.79 | 1.89 | 1.87 |
| $D_F/|f_1|$ | 0.095 | 0.092 | 0.095 | 0.102 | 0.096 | 0.095 |
| $|f_{12}|/|f_1|$ | 0.58 | 0.67 | 0.60 | 0.60 | 0.63 | 0.57 |
| $|f_{13}|/|f_1|$ | 1.77 | 2.00 | 1.32 | 1.77 | 1.41 | 1.89 |
| $f_{14}/|f_1|$ | 1.64 | 2.05 | 1.59 | 1.89 | 1.57 | 1.64 |
| $f_{21}/f_2$ | 2.38 | 2.21 | 2.10 | 2.05 | 2.89 | 2.0 |
| $f_{22}/f_2$ | 1.48 | 1.88 | 1.40 | 1.72 | 1.47 | 1.58 |
| $f_{23}/f_2$ | 2.07 | 1.89 | 3.09 | 2.15 | 1.80 | 2.09 |
| $|f_{24}|/f_2$ | 0.55 | 0.63 | 0.53 | 0.58 | 0.56 | 0.58 |
| $f_{25}/f_2$ | 1.04 | 1.14 | 0.92 | 1.06 | 1.05 | 1.18 |
| $Q_{11}$ | 0.67 | 1.73 | 0.89 | 0.85 | 1.04 | 0.53 |
| $|Q_{12}|$ | 1.02 | 1.22 | 1.05 | 1.07 | 1.17 | 0.96 |
| $|Q_{13}|$ | 1.65 | 1.07 | 1.63 | 1.73 | 1.59 | 1.70 |
| $Q_{14}$ | 3.13 | 5.37 | 2.43 | 3.04 | 2.37 | 3.00 |
| $Q_{21}$ | 0.54 | 0.12 | 0.33 | 0.43 | 0.32 | 0.19 |
| $Q_{22}$ | 1.19 | 2.25 | 1.24 | 1.62 | 1.23 | 1.43 |
| $Q_{23}$ | 3.81 | 3.52 | 6.72 | 4.25 | 3.38 | 4.09 |
| $|Q_{24}|$ | 1.07 | 1.21 | 0.90 | 1.23 | 1.18 | 1.24 |
| $|Q_{25}|$ | 0.21 | 0.31 | 0.25 | 0.03 | 0.00 | 0.29 |

| | Embodiments of Type II | | | | | |
|---|---|---|---|---|---|---|
| | 7 | 8 | 9 | 10 | 11 | 12 |
| $f_{11}/|f_1|$ | 5.02 | 4.00 | 4.25 | 3.62 | 3.62 | 3.62 |
| $D_F/|f_1|$ | 0.128 | 0.184 | 0.184 | 0.128 | 0.128 | 0.128 |
| $|f_{12}|/|f_1|$ | 0.91 | 0.88 | 0.89 | 0.87 | 0.87 | 0.87 |
| $|f_{13}|/|f_1|$ | 1.37 | 1.54 | 1.54 | 1.34 | 1.37 | 1.37 |
| $f_{14}/|f_1|$ | 1.84 | 2.25 | 2.25 | 1.83 | 1.88 | 1.85 |
| $f_{21}/f_2$ | 2.19 | 2.22 | 2.22 | 2.18 | 2.21 | 2.19 |
| $f_{22}/f_2$ | 1.39 | 1.38 | 1.38 | 1.37 | 1.36 | 1.39 |
| $f_{23}/f_2$ | 3.77 | 3.66 | 2.89 | 3.72 | 3.48 | 3.61 |
| $|f_{24}|/f_2$ | 0.52 | 0.53 | 0.54 | 0.55 | 0.54 | 0.52 |
| $f_{25}/f_2$ | 1.66 | 1.78 | 1.76 | 2.16 | 2.16 | 2.16 |
| $f_{26}/f_2$ | 1.59 | 1.57 | 1.74 | 1.40 | 1.46 | 1.37 |
| $Q_{11}$ | 1.17 | 1.05 | 1.05 | 1.08 | 1.08 | 1.0 |
| $|Q_{12}|$ | 1.57 | 1.47 | 1.50 | 1.48 | 1.48 | 1.48 |
| $|Q_{13}|$ | 1.77 | 2.14 | 2.14 | 1.72 | 1.79 | 1.77 |
| $Q_{14}$ | 3.09 | 3.85 | 3.71 | 2.93 | 2.73 | 3.36 |
| $Q_{21}$ | 0.70 | 0.54 | 0.54 | 0.70 | 0.72 | 0.67 |
| $Q_{22}$ | 1.38 | 1.28 | 1.28 | 1.18 | 1.38 | 1.38 |
| $Q_{23}$ | 5.84 | 5.50 | 3.45 | 5.38 | 2.60 | 4.38 |
| $|Q_{24}|$ | 0.52 | 0.50 | 0.48 | 0.49 | 0.50 | 0.49 |
| $|Q_{25}|$ | 1.60 | 2.06 | 1.61 | 2.15 | 2.15 | 2.15 |
| $Q_{26}$ | 0.64 | 1.10 | 1.24 | 0.51 | 0.58 | 0.48 |

| | Embodiment of Type III | |
|---|---|---|
| | 13 | 14 |
| $f_{11}/|f_1|$ | 1.40 | 1.41 |
| $D_F/|f_1|$ | 0.132 | 0.113 |
| $|f_{12}|/|f_1|$ | 0.85 | 0.64 |
| $|f_{13}|/|f_1|$ | 1.04 | 0.97 |
| $f_{14}/|f_1|$ | 1.73 | 1.51 |
| $f_{21}/f_2$ | 1.23 | 1.23 |
| $f_{22}/f_2$ | 1.21 | 1.24 |
| $|f_{23}|/f_2$ | 0.52 | 0.54 |
| $f_{24}/f_2$ | 2.05 | 1.76 |
| $f_{25}/f_2$ | 1.81 | 2.18 |
| $Q_{11}$ | 1.33 | 1.34 |
| $|Q_{12}|$ | 1.33 | 1.35 |
| $|Q_{13}|$ | 1.53 | 1.44 |
| $Q_{14}$ | 3.55 | 2.99 |
| $Q_{21}$ | 0.60 | 0.66 |
| $Q_{22}$ | 2.00 | 1.61 |
| $|Q_{23}|$ | 0.71 | 0.62 |
| $|Q_{24}|$ | 3.19 | 2.31 |
| $Q_{25}$ | 1.27 | 2.08 |

It is believed that the advantages and improved results furnished by the wide-angle zoom lens system of the invention will be apparent from the foregoing description of several preferred embodiments of the invention. Various changes and modifications may be made without departing from the spirit and scope of the invention as sought to be defined in the following claims.

I claim:

1. A wide-angle zoom lens system comprising a divergent lens group and a convergent lens group in the order from the object side, both of said groups being movable on the optical axis of the lens system to vary the air space between the groups so that the magnification of the image is variable while the image plane is maintained at a fixed position, the divergent lens group including four air-spaced components which are, in the order from the object side, a first positive component with the more curved surface facing the object side, a first negative component with the more curved surface facing the image side, a second negative component with the more curved surface facing the image side and a first positive meniscus component convex to the object side, said first positive component and said first negative component defining therebetween an air chamber having convergent power, said first negative component and said second negative component defining therebetween an air chamber having divergent power with its more curved surface facing the object side, the axial space between said second negative component and said first positive meniscus component being greater than the space between said first positive component and said first negative component, said covergent lens group including at least four positive components and a negative component, all components being separated from one another.

2. A wide-angle zoom lens system according to Claim 1, wherein said optical system satisfies the following conditions:

$$1.2 \leq \frac{f_{11}}{|f_1|} \leq 6.0$$

$$0.05 \leq \frac{D_F}{|f_1|} \leq 0.2$$

$$|R_4| < |R_6|$$

wherein $f_{11}$ represents the focal length of the first positive component, $f_1$ represents the focal length of the divergent lens group, $D_F$ represents the air space between the second negative component and the first positive meniscus component, and $R_4$ and $R_6$ represent the curvature radii of rear surfaces of said first negative component and said second negative component, respectively.

3. A wide-angle zoom lens system according to claim 2, wherein said convergent lens group includes in the order from the object side a second positive component, a second positive meniscus component convex to the object side, a third positive meniscus component convex to the object side, a third negative component and a third positive component.

4. A wide-angle zoom lens system according to claim 3, wherein said optical system further satisfies the following conditions.

$$0.4 < \frac{|f_{12}|}{|f_1|} < 0.9$$

$$1.0 < \frac{|f_{13}|}{|f_1|} < 2.4$$

$$1.3 < \frac{f_{14}}{|f_1|} < 2.4$$

$$1.7 < \frac{f_{21}}{f_2} < 3.2$$

$$1.1 < \frac{f_{22}}{f_2} < 2.2$$

$$1.0 < \frac{f_{23}}{f_2} < 5.0$$

$$0.4 < \frac{|f_{24}|}{f_2} < 0.8$$

$$0.6 < \frac{f_{25}}{f_2} < 1.5$$

wherein $f_1$ and $f_2$ represent the focal length of the divergent group and of the convergent group, respectively, $f_{1i}$ and $f_{2i}$ represent the focal length of each component of the divergent group and of the convergent group, respectively, and the subscript i represents the order of each component from the object side.

5. A wide-angle zoom lens system according to claim 4, wherein said optical system further satisfies the following conditions:

$$0.4 < Q_{11} < 2.0$$

$$0.8 < |Q_{12}| < 1.5$$
$$0.9 < |Q_{13}| < 2.2$$
$$2.0 < Q_{14} < 6.0$$
$$0.1 < Q_{21} < 0.7$$
$$1.0 < Q_{22} < 2.5$$
$$2.0 < Q_{23} < 8.0$$
$$0.7 < |Q_{24}| < 1.5$$
$$0 \leq |Q_{25}| < 1.0$$

wherein $Q_{1i}$ and $Q_{2i}$ represent the shape factor of each component of the divergent group and of the convergent group, respectively, and the subscript i represents the order of each component from the object side, shape factor Q being defined as $$Q = \frac{r_R + r_F}{r_R - r_F}$$

where $r_R$ and $r_F$ represent the radius of curvature of the rearmost and the foremost surface of each component respectively.

6. A wide-angle zoom lens system according to claim 5, having the numerical data as follows:

| | f=100−137.404−190.975  F/3.5<br>Bf=121.0703−146.391−183.869 | | | |
|---|---|---|---|---|
| $f_1 = -166.3988$ | $r_1 = 222.515$<br>$r_2 = -1136.472$<br>$r_3 = 6006.076$<br>$r_4 = 66.208$<br>$r_5 = 638.292$<br>$r_6 = 157.237$<br>$r_7 = 102.236$<br>$r_8 = 198.108$ | $d_1 = 22.8$<br>$d_2 = 1.9$<br>$d_3 = 4.2$<br>$d_4 = 18.9$<br>$d_5 = 4.2$<br>$d_6 = 15.8$<br>$d_7 = 10.8$<br>$d_8 = 91.3324$ | $n_1 = 1.60311$<br>$n_2 = 1.6968$<br>$n_3 = 1.713$<br>$n_4 = 1.74077$<br>39.3014 | $\nu_1 = 60.7$<br>$\nu_2 = 55.6$<br>$\nu_3 = 53.9$<br>$\nu_4 = 27.7$<br>0.2804 |
| $f_2 = 114.8669$ | $r_9 = 183.442$<br>$r_{10} = -619.365$<br>$r_{11} = 81.072$<br>$r_{12} = 919.732$<br>$r_{13} = 56.898$<br>$r_{14} = 97.450$<br>$r_{15} = 1417.995$<br>$r_{16} = 49.4$<br>$r_{17} = 193.094$<br>$r_{18} = -126.146$ | $d_9 = 12.5$<br>$d_{10} = 0.3$<br>$d_{11} = 13.6$<br>$d_{12} = 0.3$<br>$d_{13} = 12.5$<br>$d_{14} = 10.8$<br>$d_{15} = 4.2$<br>$d_{16} = 14.4$<br>$d_{17} = 10.5$ | $n_5 = 1.52$<br>$n_6 = 1.52$<br>$n_7 = 1.52$<br>$n_8 = 1.80518$<br>$n_9 = 1.64831$ | $\nu_5 = 70.1$<br>$\nu_6 = 70.1$<br>$\nu_7 = 70.1$<br>$\nu_8 = 25.5$<br>$\nu_9 = 33.8$ | wherein $r_1, r_2, r_3 \ldots$ are the curvature radii of the successive lenses as viewed from the object side, $d_1, d_2 \ldots$ are the center thicknesses and the air spaces between the successive lenses, $n_1, n_2, \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

7. A wide-angle zoom lens system according to claim 5, having the numerical data as follows:

| | f=100−141.421−200.0  F/3.5<br>Bf=121.04−148.469−187.254 | | | |
|---|---|---|---|---|
| $f_1 = -171.264$ | $r_1 = 206.703$<br>$r_2 = 769.754$<br>$r_3 = 671.617$<br>$r_4 = -971.891$<br>$r_5 = 65.723$<br>$r_6 = 6124.694$<br>$r_7 = 205.649$<br>$r_8 = 96.714$<br>$r_9 = 141.027$ | $d_1 = 18.6$<br>$d_2 = 6.3$<br>$d_3 = 10.6$<br>$d_4 = 4.3$<br>$d_5 = 19.4$<br>$d_6 = 4.3$<br>$d_7 = 15.7$<br>$d_8 = 8.6$<br>$d_9 = 99.8316 \sim 42.9479 \sim 2.7253$ | $n_1 = 1.62041$<br>$n_2 = 1.80454$<br>$n_3 = 1.67003$<br>$n_4 = 1.62041$<br>$n_5 = 1.80518$ | $\nu_1 = 60.3$<br>$\nu_2 = 39.5$<br>$\nu_3 = 47.2$<br>$\nu_4 = 60.3$<br>$\nu_5 = 25.5$ |
| $f_2 = 113.4$ | $r_{10} = 311.7$<br>$r_{11} = -394.694$<br>$r_{12} = 83.54$<br>$r_{13} = 216.683$<br>$r_{14} = 61.466$<br>$r_{15} = 110.186$ | $d_{10} = 7.1$<br>$d_{11} = 0.3$<br>$d_{12} = 9.4$<br>$d_{13} = 0.3$<br>$d_{14} = 9.7$<br>$d_{15} 11.1$ | $n_6 = 1.6968$<br>$n_7 = 1.62041$<br>$n_8 = 1.60311$ | $\nu_6 = 55.6$<br>$\nu_7 = 60.3$<br>$\nu_8 = 60.7$ |

-continued

| f=100−141.421−200.0  F/3.5 |
|---|
| Bf=121.04−148.469−187.254 |

| | | | |
|---|---|---|---|
| $r_{16}=540.08$ | $d_{16}=8.9$ | $n_9=1.80518$ | $\nu_9=25.5$ |
| $r_{17}=51.494$ | $d_{17}=16.0$ | | |
| $r_{18}=258.971$ | $d_{18}=8.9$ | $n_{10}=1.70154$ | $\nu_{10}=41.1$ |
| $r_{19}=-137.347$ | | | | wherein $r_1, r_2, r_3 \ldots$ are the curvature radii of the successive lenses as viewed from the object side, $d_1, d_2 \ldots$ are the center thicknesses and the air spaces between the successive lenses, $n_1, n_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

8. A wide-angle zoom lens system according to claim 5, having the numerical data as follows:

| f=100−137.4−191.0  F/3.5  Angle of view 62°-34° | | | | |
|---|---|---|---|---|
| Bf=121.28−147.10−184.08 | | | | |
| $f_1=-166.39$ | $r_1=171.693$ | $d_1=22.8$ | $n_1=1.60323$ | $\nu_1=42.5$ |
| | $r_2=-2879.172$ | $d_2=1.9$ | | |
| | $r_3=2776.004$ | $d_3=4.2$ | $n_2=1.67790$ | $\nu_2=55.5$ |
| | $r_4=66.347$ | $d_4=18.9$ | | |
| | $r_5=496.166$ | $d_5=4.2$ | $n_3=1.7130$ | $\nu_3=53.9$ |
| | $r_6=118.458$ | $d_6=15.8$ | | |
| | $r_7=94.690$ | $d_7=10.8$ | $n_4=1.59507$ | $\nu_4=35.6$ |
| | $r_8=227.424$ | $d_8=92.86-40.81-1.80$ | | |
| | $r_9=202.204$ | $d_9=9.7$ | $n_5=1.62041$ | $\nu_5=60.3$ |
| | $r_{10}=-202.204$ | $d_{10}=2.8$ | $n_6=1.80518$ | $\nu_6=25.5$ |
| | $r_{11}=-400.225$ | $d_{11}=0.3$ | | |
| | $r_{12}=73.964$ | $d_{12}=13.6$ | $n_7=1.51118$ | $\nu_7=50.9$ |
| | $r_{13}=682.897$ | $d_{13}=0.3$ | | |
| $f_2=114.87$ | $r_{14}=57.583$ | $d_{14}=12.5$ | $n_8=1.51680$ | $\nu_8=64.2$ |
| | $r_{15}=77.700$ | $d_{15}=10.8$ | | |
| | $r_{16}=-1029.495$ | $d_{16}=4.2$ | $n_9=1.80518$ | $\nu_9=25.5$ |
| | $r_{17}=51.911$ | $d_{17}=14.4$ | | |
| | $r_{18}=179.496$ | $d_{18}=10.5$ | $n_{10}=1.64831$ | $\nu_{10}=33.8$ |
| | $r_{19}=-108.731$ | | | | wherein $r_1, r_2, r_3 \ldots$ are the curvature radii of the successive lenses as viewed from the object side, $d_1, d_2 \ldots$ are the center thicknesses and the air spaces between the successive lenses, $n_1, n_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

9. A wide-angle zoom lens system according to claim 5, having the numerical data as follows:

| f=100−137.404−190.975  F/3.5 | | | | |
|---|---|---|---|---|
| Bf=120.761−146.581−183.561 | | | | |
| $f_1=-166.3988$ | $r_1=194.236$ | $d_1=19.4$ | $n_1=1.60311$ | $\nu_1=60.7$ |
| | $r_2=-2352.847$ | $d_2=3.3$ | | |
| | $r_3=1956.251$ | $d_3=4.2$ | $n_2=1.6935$ | $\nu_2=53.4$ |
| | $r_4=67.296$ | $d_4=18.9$ | | |
| | $r_5=578.411$ | $d_5=8.3$ | $n_3=1.71736$ | $\nu_3=29.5$ |
| | $r_6=-1049.234$ | $d_6=4.2$ | $n_4=1.72$ | $\nu_4=50.3$ |
| | $r_7=154.167$ | $d_7=17.0$ | | |
| | $r_8=99.498$ | $d_8=10.8$ | $n_5=1.61293$ | $\nu_5=36.9$ |
| | $r_9=197.219$ | $d_9=91.2871\sim39.2561\sim0.2350$ | | |
| | $r_{10}=169.87$ | $d_{10}=12.5$ | $n_6=1.52$ | $\nu_6=70.1$ |
| | $r_{11}=-427.556$ | $d_{11}=0.3$ | | |
| | $r_{12}=79.709$ | $d_{12}=12.5$ | $n_7=1.52$ | $\nu_7=70.1$ |
| | $r_{13}=337.201$ | $d_{13}=0.3$ | | |
| $f_2=114.8669$ | $r_{14}=55.199$ | $d_{14}=12.5$ | $n_8=1.52$ | $\nu_8=70.1$ |
| | $r_{15}=89.146$ | $d_{15}=10.8$ | | |
| | $r_{16}=457.998$ | $d_{16}=4.2$ | $n_9=1.80518$ | $\nu_9=25.5$ |
| | $r_{17}=47.719$ | $d_{17}=14.4$ | | |
| | $r_{18}=161.673$ | $d_{18}=10.5$ | $n_{10}=1.64831$ | $\nu_{10}=33.8$ |
| | $r_{19}=-151.051$ | | | | wherein $r_1, r_2, r_3 \ldots$ are the curvature radii of the successive lenses as viewed from the object side, $d_1, d_2 \ldots$ are the center thicknesses and the air spaces between the successive lenses, $n_1, n_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

10. A wide-angle zoom lens system according to claim 5, having the numerical data as follows:

| | | f=100−137.404−190.975 F/3.5 | | | |
|---|---|---|---|---|---|
| | | Bf=121.7277−147.548−184.528 | | | |
| $f_1 = -166.3988$ | | $r_1 = 186.079$ | $d_1 = 18.6$ | $n_1 = 1.60311$ | $\nu_1 = 60.7$ |
| | | $r_2 = 8785.220$ | $d_2 = 3.9$ | | |
| | | $r_3 = 847.055$ | $d_3 = 4.2$ | $n_2 = 1.6935$ | $\nu_2 = 53.4$ |
| | | $r_4 = 66.572$ | $d_4 = 18.9$ | | |
| | | $r_5 = 562.782$ | $d_5 = 4.2$ | $n_3 = 1.713$ | $\nu_3 = 53.9$ |
| | | $r_6 = 128.685$ | $d_6 = 16.0$ | | |
| | | $r_7 = 97.596$ | $d_7 = 16.7$ | $n_4 = 1.59507$ | $\nu_4 = 35.6$ |
| | | $r_8 = 6520.952$ | $d_8 = 2.5$ | $n_5 = 1.58913$ | $\nu_5 = 61.2$ |
| | | $r_9 = 239.914$ | $d_9 = 91.4175 \sim 39.3864 \sim 0.3654$ | | |
| $f_2 = 114.8669$ | | $r_{10} = 274.822$ | $d_{10} = 9.7$ | $n_6 = 1.62041$ | $\nu_6 = 60.3$ |
| | | $r_{11} = -245.372$ | $d_{11} = 2.8$ | $n_7 = 1.80518$ | $\nu_7 = 25.5$ |
| | | $r_{12} = -527.7$ | $d_{12} = 0.3$ | | |
| | | $r_{13} = 78.69$ | $d_{13} = 13.6$ | $n_8 = 1.51454$ | $\nu_8 = 54.6$ |
| | | $r_{14} = 776.541$ | $d_{14} = 0.3$ | | |
| | | $r_{15} = 53.662$ | $d_{15} = 12.5$ | $n_9 = 1.51823$ | $\nu_9 = 59.0$ |
| | | $r_{16} = 98.753$ | $d_{16} = 11.4$ | | |
| | | $r_{17} = 556.455$ | $d_{17} = 3.6$ | $n_{10} = 1.80518$ | $\nu_{10} = 25.5$ |
| | | $r_{18} = 46.886$ | $d_{18} = 14.4$ | | |
| | | $r_{19} = 157.306$ | $d_{19} = 10.5$ | $n_{11} = 1.66446$ | $\nu_{11} = 35.9$ |
| | | $r_{20} = -157.664$ | | | | wherein $r_1, r_2, r_3 \ldots$ are the curvature radii of the successive lenses as viewed from the object side, $d_1, d_2 \ldots$ are the center thicknesses and the air spaces between the successive lenses, $n_1, n_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

11. A wide-angle zoom lens system according to claim 5, having the numerical data as follows:

| | | f=100−137.404−190.975 F/3.5 | | | |
|---|---|---|---|---|---|
| | | Bf=118.757−144.577−181.557 | | | |
| $f_1 = -166.3988$ | | $r_1 = 243.195$ | $d_1 = 22.8$ | $n_1 = 1.60311$ | $\nu_1 = 60.7$ |
| | | $r_2 = -800.7$ | $d_2 = 1.9$ | | |
| | | $r_3 = -3010.471$ | $d_3 = 4.2$ | $n_2 = 1.6968$ | $\nu_2 = 55.6$ |
| | | $r_4 = 67.127$ | $d_4 = 18.9$ | | |
| | | $r_5 = 640.572$ | $d_5 = 4.2$ | $n_3 = 1.713$ | $\nu_3 = 53.9$ |
| | | $r_6 = 165.485$ | $d_6 = 15.8$ | | |
| | | $r_7 = 105.477$ | $d_7 = 10.8$ | $n_4 = 1.74077$ | $\nu_4 = 27.7$ |
| | | $r_8 = 211.185$ | $d_8 = 91.158 \sim 39.1274 \sim 0.1063$ | | |
| $f_2 = 114.8669$ | | $r_9 = 198.813$ | $d_9 = 12.5$ | $n_5 = 1.52$ | $\nu_5 = 70.1$ |
| | | $r_{10} = -294.505$ | $d_{10} = 0.3$ | | |
| | | $r_{11} = 78.865$ | $d_{11} = 13.0$ | $n_6 = 1.52$ | $\nu_6 = 70.1$ |
| | | $r_{12} = 449.942$ | $d_{12} = 0.3$ | | |
| | | $r_{13} = 54.224$ | $d_{13} = 11.0$ | $n_7 = 1.52$ | $\nu_7 = 70.1$ |
| | | $r_{14} = 89.348$ | $d_{14} = 10.8$ | | |
| | | $r_{15} = 443.432$ | $d_{15} = 4.2$ | $n_8 = 1.80518$ | $\nu_8 = 25.5$ |
| | | $r_{16} = 47.494$ | $d_{16} = 16.6$ | | |
| | | $r_{17} = 232.021$ | $d_{17} = 2.8$ | $n_9 = 1.6516$ | $\nu_9 = 58.5$ |
| | | $r_{18} = 207.251$ | $d_{18} = 7.8$ | $n_{10} = 1.61293$ | $\nu_{10} = 36.9$ |
| | | $r_{19} = -127.066$ | | | | wherein $r_1, r_2, r_3 \ldots$ are the curvature radii of the successive lenses as viewed from the object side, $d_1, d_2 \ldots$ are the center thicknesses and the air spaces between the successive lenses, $n_1, n_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

12. A wide-angle zoom lens system according to claim 3, wherein said third positive component includes a positive meniscus component having its convex surface facing the image side and a positive component.

13. a Wide-angle zoom lens system according to claim 12, wherein said optical system further satisfied the following conditions:

$$0.5 < \frac{|f_{12}|}{|f_1|} < 1.2$$

$$1.0 < \frac{|f_{13}|}{|f_1|} < 1.8$$

$$1.5 < \frac{f_{14}}{|f_1|} < 2.5$$

$$2.0 < \frac{f_{21}}{f_2} < 2.5$$

$$1.1 < \frac{f_{22}}{f_2} < 1.6$$

$$2.0 < \frac{f_{23}}{f_2} < 5.0$$

$$0.4 < \frac{|f_{24}|}{f_2} < 0.7$$

$$1.3 < \frac{f_{25}}{f_2} < 2.5$$

$$1.0 < \frac{f_{26}}{f_2} < 2.0$$

wherein $f_1$ and $f_2$ represent the focal length of the divergent group and of the convergent group, respectively, $f_{1i}$ and $f_{2i}$ represent the focal length of each component of the divergent group and of the convergent group, respectively, and the subscript i represents the order of each component from the object side.

14. A wide-angle zoom lens system according to claim 13, wherein said optical system further satisfies the following conditions:

$0.8 < Q_{11} < 1.5$
$1.0 < |Q_{12}| < 1.8$
$1.3 < |Q_{13}| < 2.5$
$2.0 < Q_{14} < 5.0$
$0.3 < Q_{21} < 1.0$
$0.1 < Q_{22} < 1.6$
$2.0 < Q_{23} < 7.0$
$0.3 < |Q_{24}| < 0.7$
$1.2 < Q_{25} < 2.5$
$0.3 < Q_{26} < 1.5$ wherein $Q_{1i}$ and $Q_{2i}$ represent the shape factor of each component of the divergent group and of the convergent group, respectively, the subscript i represents the order of each component from the object side, shape factor Q being defined as $$Q = \frac{r_R + r_F}{r_R - r_F}$$

$r_R$ and $r_F$ represent the radius of curvature of the rearmost and the foremost surface of each component, respectively.

15. A wide-angle zoom lens system according to claim 14, having the numerical data as follows:

| f = 100 − 137.8 − 190.3 Bf = 134.952 − 164.163 − 204.768 | | | | |
|---|---|---|---|---|
| | $r_1 = 418.897$ | $d_1 = 23.7$ | $\eta_1 = 1.51835$ | $\nu_1 = 60.3$ |
| | $r_2 = 5236.216$ | $d_2 = 1.4$ | $\eta_2 = 1.$ | |
| | $r_3 = 394.601$ | $d_3 = 5.2$ | $\eta_3 = 1.713$ | $\nu_2 = 53.9$ |
| $f_1 = -174.541$ | $r_4 = 87.135$ | $d_4 = 27.6$ | $\eta_4 = 1.$ | |
| | $r_5 = 436.517$ | $d_5 = 13.3$ | $\eta_5 = 1.713$ | $\nu_3 = 53.9$ |
| | $r_6 = 121.243$ | $d_6 = 22.3$ | $\eta_6 = 1.$ | |
| | $r_7 = 118.688$ | $d_7 = 14.7$ | $\eta_7 = 1.71736$ | $\nu_4 = 29.5$ |
| | $r_8 = 232.016$ | | $\eta_8 = 1.$ | |
| | | $d_8 = 119.0764 \sim 54.487 \sim 7.3048$ | | |
| | $r_9 = 179.533$ | $d_9 = 19.2$ | $\eta_9 = 1.52$ | $\nu_5 = 70.1$ |
| | $r_{10} = -1017.100$ | $d_{10} = 0.3$ | $\eta_{10} = 1.$ | |
| | $r_{11} = 83.779$ | $d_{11} = 25.1$ | $\eta_{11} = 1.52$ | $\nu_6 = 70.1$ |
| | $r_{12} = 527.112$ | $d_{12} = 0.3$ | $\eta_{12} = 1.$ | |
| | $r_{13} = 102.344$ | $d_{13} = 15.0$ | $\eta_{13} = 1.60729$ | $\nu_7 = 59.5$ |
| $f_2 = 134.988$ | $r_{14} = 144.606$ | $d_{14} = 12.6$ | $\eta_{14} = 1.$ | |
| | $r_{15} = -237.375$ | $d_{15} = 8.0$ | $\eta_{15} = 1.80518$ | $\nu_8 = 25.5$ |
| | $r_{16} = 76.798$ | $d_{16} = 8.4$ | $\eta_{16} = 1.$ | |
| | $r_{17} = -446.359$ | $d_{17} = 12.2$ | $\eta_{17} = 1.59551$ | $\nu_9 = 39.2$ |
| | $r_{18} = -103.649$ | $d_{18} = 0.3$ | $\eta_{18} = 1.$ | |
| | $r_{19} = 163.810$ | $d_{19} = 7.7$ | $\eta_{19} = 1.62606$ | $\nu_{10} = 39.1$ |
| | $r_{20} = -742.982$ | | | | wherein $r_1, r_2, r_3 \ldots$ are the curvature radii of the successive lenses as viewed from the object side, $d_1, d_2 \ldots$ are the center thicknesses and the air spaces between the successive lenses, $\eta_1, \eta_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

16. A wide-angle zoom lens system according to claim 14, having the numerical data as follows:

| f = 100 − 137.777 − 190.291 Bf = 132.526 − 161.737 − 202.342 | | | | |
|---|---|---|---|---|
| | $r_1 = 406.33$ | $d_1 = 24.8$ | $\eta_1 = 1.59507$ | $\nu_1 = 35.6$ |
| | $r_2 = 17519.192$ | $d_2 = 2.1$ | $\eta_2 = 1.$ | |
| | $r_3 = 464.264$ | $d_3 = 4.5$ | $\eta_3 = 1.713$ | $\nu_2 = 53.9$ |
| $f_1 = -174.541$ | $r_4 = 88.368$ | $d_4 = 23.4$ | $\nu_4 = 1.$ | |
| | $r_5 = 332.849$ | $d_5 = 4.2$ | $\eta_5 = 1.713$ | $\nu_3 = 53.9$ |
| | $r_6 = 120.856$ | $d_6 = 32.1$ | $\eta_6 = 1.$ | |
| | $r_7 = 119.483$ | $d_7 = 14.7$ | $\eta_7 = 1.68893$ | $\nu_4 = 31.1$ |
| | $r_8 = 203.329$ | | $\eta_8 = 1.$ | |
| | | $d_8 = 114.3882 \sim 49.7987 \sim 2.61650$ | | |
| | $r_9 = 193.841$ | $d_9 = 19.2$ | $\eta_9 = 1.50032$ | $\nu_5 = 81.9$ |
| | $r_{10} = -644.406$ | $d_{10} = 0.3$ | $\eta_{10} = 1.$ | |
| | $r_{11} = 82.586$ | $d_{11} = 25.1$ | $\eta_{11} = 1.50032$ | $\nu_6 = 81.9$ |
| $f_2 = 134.988$ | $r_{12} = 663.254$ | $d_{12} = 0.3$ | $\eta_{12} = 1.$ | |
| | $r_{13} = 88.963$ | $d_{13} = 15.0$ | $\eta_{13} = 1.51833$ | $\nu_7 = 59.0$ |
| | $r_{14} = 128.497$ | $d_{14} = 12.6$ | $\eta_{14} = 1.$ | |
| | $r_{15} = -210.147$ | $d_{15} = 5.9$ | $\eta_{15} = 1.80518$ | $\nu_8 = 25.5$ |
| | $r_{16} = -104.724$ | $d_{16} = 2.8$ | $\eta_{16} = 1.74$ | $\nu_9 = 28.2$ |
| | $r_{17} = 69.816$ | $d_{17} = 8.7$ | $\eta_{17} = 1.$ | |
| | $r_{18} = -233.727$ | $d_{18} = 11.0$ | $\eta_{18} = 1.50137$ | $\nu_{10} = 56.5$ |
| | $r_{19} = -80.834$ | $d_{19} = 0.3$ | $\eta_{19} = 1.$ | |
| | $r_{20} = 120.289$ | $d_{20} = 9.4$ | $\eta_{20} = 1.59507$ | $\nu_{11} = 35.6$ |
| | $r_{21} = 2627.557$ | | | | wherein $r_1, r_2, r_3 \ldots$ are the curvature radii of the successive lenses as viewed from the object side, $d_1, d_2 \ldots$ are the center thicknesses and the air spaces between the successive lenses, $\eta_1, \eta_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

17. A wide-angle zoom lens system according to claim 14, having the numerical data as follows:

| | f=100−137.78−190.29  Bf=131.128−160.339−200.945 | | | |
|---|---|---|---|---|
| $f_1 = -174.541$ | $r_1 = 427.624$ | $d_1 = 24.8$ | $\eta_1 = 1.5907$ | $\nu_1 = 35.6$ |
| | $r_2 = 17519.167$ | $d_2 = 2.1$ | $\eta_2 = 1.$ | |
| | $r_3 = 443.261$ | $d_3 = 4.5$ | $\eta_3 = 1.713$ | $\nu_2 = 53.9$ |
| | $r_4 = 88.368$ | $d_4 = 23.4$ | $\eta_4 = 1.$ | |
| | $r_5 = 332.849$ | $d_5 = 4.2$ | $\eta_5 = 1.713$ | $\nu_3 = 53.9$ |
| | $r_6 = 120.856$ | $d_6 = 32.1$ | $\eta_6 = 1.$ | |
| | $r_7 = 119.483$ | $d_7 = 14.7$ | $\eta_7 = 1.67270$ | $\nu_4 = 32.2$ |
| | $r_8 = 207.558$ | | $\eta_8 = 1.$ | |
| | | $d_8 = 114.2727 \sim 49.6832 \sim 2.5010$ | | |
| $f_2 = 134.988$ | $r_9 = 193.841$ | $d_9 = 19.2$ | $\eta_9 = 1.50032$ | $\nu_5 = 81.9$ |
| | $r_{10} = -644.061$ | $d_{10} = 3.5$ | $\eta_{10} = 1.$ | |
| | $r_{11} = 82.586$ | $d_{11} = 25.1$ | $\eta_{11} = 1.50032$ | $\nu_6 = 81.9$ |
| | $r_{12} = 663.254$ | $d_{12} = 3.5$ | $\eta_{12} = 1.$ | |
| | $r_{13} = 95.578$ | $d_{13} = 15.0$ | $\eta_{13} = 1.51118$ | $\nu_7 = 50.9$ |
| | $r_{14} = 173.745$ | $d_{14} = 12.6$ | $\eta_{14} = 1.$ | |
| | $r_{15} = -201.126$ | $d_{15} = 5.9$ | $\eta_{15} = 1.80518$ | $\nu_8 = 25.5$ |
| | $r_{16} = -104.724$ | $d_{16} = 2.8$ | $\eta_{16} = 1.74$ | $\nu_9 = 28.2$ |
| | $r_{17} = 69.816$ | $d_{17} = 8.7$ | $\eta_{17} = 1.$ | |
| | $r_{18} = -338.609$ | $d_{18} = 4.2$ | $\eta_{18} = 1.67790$ | $\nu_{10} = 55.5$ |
| | $r_{19} = 837.795$ | $d_{19} = 8.7$ | $\eta_{19} = 1.59507$ | $\nu_{11} = 56.5$ |
| | $r_{20} = -79.565$ | $d_{20} = 3.5$ | $\eta_{20} = 1.$ | |
| | $r_{21} = 125.025$ | $d_{21} = 9.4$ | $\eta_{21} = 1.59507$ | $\nu_{12} = 35.6$ |
| | $r_{22} = 1151.140$ | | $\eta_{22} = 1.$ | | wherein $r_1, r_2, r_3 \ldots$ are the curvature radii of the successive lenses as viewed from the object side, $d_1, d_2 \ldots$ are the center thicknesses and the air spaces between the successive lenses, $\eta_1, \eta_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

18. A wide-angle zoom lens system according to claim 14, having the numerical data as follows:

| | f=100−137.8−190.3  Bf=134.829−164.039−204.645 | | | |
|---|---|---|---|---|
| $f_1 = -174.541$ | $r_1 = 366.919$ | $d_1 = 23.7$ | $\eta_1 = 1.60311$ | $\nu_1 = 60.7$ |
| | $r_2 = 9892.783$ | $d_2 = 1.4$ | $\eta_2 = 1.$ | |
| | $r_3 = 446.126$ | $d_3 = 5.2$ | $\eta_3 = 1.713$ | $\nu_2 = 53.9$ |
| | $r_4 = 86.883$ | $d_4 = 27.6$ | $\eta_4 = 1.$ | |
| | $r_5 = 457.296$ | $d_5 = 13.3$ | $\eta_5 = 1.713$ | $\nu_3 = 53.9$ |
| | $r_6 = 120.826$ | $d_6 = 22.3$ | $\eta_6 = 1.$ | |
| | $r_7 = 117.621$ | $d_7 = 14.7$ | $\eta_7 = 1.68893$ | $\nu_4 = 31.1$ |
| | $r_8 = 239.700$ | | $\eta_8 = 1.$ | |
| | | $d_8 = 118.0228 \sim 53.4333 \sim 6.2511$ | | |
| $f_2 = 134.988$ | $r_9 = 179.532$ | $d_9 = 19.2$ | $\eta_9 = 1.52$ | $\nu_5 = 70.1$ |
| | $r_{10} = -1012.684$ | $d_{10} = 0.3$ | $\eta_{10} = 1.$ | |
| | $r_{11} = 83.430$ | $d_{11} = 20.9$ | $\eta_{11} = 1.52$ | $\nu_6 = 70.1$ |
| | $r_{12} = -698.162$ | $d_{12} = 4.2$ | $\eta_{12} = 1.68893$ | $\nu_7 = 31.1$ |
| | $r_{13} = 991.505$ | $d_{13} = 0.3$ | $\eta_{13} = 1.$ | |
| | $r_{14} = 102.344$ | $d_{14} = 15.0$ | $\eta_{14} = 1.58144$ | $\nu_8 = 40.8$ |
| | $r_{15} = 149.038$ | $d_{15} = 12.6$ | $\eta_{15} = 1.$ | |
| | $r_{16} = -214.336$ | $d_{16} = 5.2$ | $\eta_{16} = 1.80518$ | $\nu_9 = 25.5$ |
| $f_2 = 134.988$ | $r_{17} = -166.351$ | $d_{17} = 2.8$ | $\eta_{17} = 1.74$ | $\nu_{10} = 28.2$ |
| | $r_{18} = 72.853$ | $d_{18} = 7.0$ | $\eta_{18} = 1.$ | |
| | $r_{19} = -260.065$ | $d_{19} = 12.2$ | $\eta_{19} = 1.50137$ | $\nu_{11} = 56.5$ |
| | $r_{20} = -94.95$ | $d_{20} = 0.3$ | $\eta_{20} = 1.$ | |
| | $r_{21} = 156.004$ | $d_{21} = 7.7$ | $\eta_{21} = 1.62606$ | $\nu_{12} = 39.1$ |
| | $r_{22} = -475.602$ | | $\eta_{22} = 1.$ | | wherein $r_1, r_2, r_3 \ldots$ are the curvature radii of the successive lenses as viewed from the object side, $d_1, d_2 \ldots$ are the center thicknesses and the air spaces between the successive lenses, $\eta_1, \eta_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

19. A wide-angle zoom lens system according to claim 14, having the numerical data as follows:

| | f=100−137.8−190.3  Bf=134.301−163.512−204.118 | | | |
|---|---|---|---|---|
| $f_1 = -174.541$ | $r_1 = 366.919$ | $d_1 = 23.7$ | $\eta_1 = 1.60311$ | $\nu_1 = 60.7$ |
| | $r_2 = 9892.783$ | $d_2 = 1.4$ | $\eta_2 = 1.$ | |
| | $r_3 = 446.126$ | $d_3 = 5.2$ | $\eta_3 = 1.713$ | $\nu_2 = 53.9$ |
| | $r_4 = 86.883$ | $d_4 = 27.6$ | $\eta_4 = 1.$ | |
| | $r_5 = 436.547$ | $d_5 = 9.8$ | $\eta_5 = 1.64831$ | $\nu_3 = 33.8$ |
| | $r_6 = 2683.735$ | $d_6 = 3.5$ | $\eta_6 = 1.713$ | $\nu_4 = 53.9$ |

-continued $$f = 100 - 137.8 - 190.3$$
$$Bf = 134.301 - 163.512 - 204.118$$

| | | | | |
|---|---|---|---|---|
| | $r_7 = 123.569$ | $d_7 = 22.3$ | $\eta_7 = 1.$ | |
| | $r_8 = 118.688$ | $d_8 = 14.7$ | $\eta_8 = 1.64831$ | $\nu_5 = 33.8$ |
| | $r_9 = 255.510$ | | $\eta_9 = 1.$ | |
| | | $d_9 = 118.4759 \sim 53.8864 \sim 6.7043$ | | |
| | $r_{10} = 179.532$ | $d_{10} = 19.2$ | $\eta_{10} = 1.52$ | $\nu_6 = 70.1$ |
| | $r_{11} = -1117.059$ | $d_{11} = 0.3$ | $\eta_{11} = 1.$ | |
| | $r_{12} = 83.430$ | $d_{12} = 25.1$ | $\eta_{12} = 1.53172$ | $\nu_7 = 48.9$ |
| $f_2 = 134.988$ | $r_{13} = 523.622$ | $d_{13} = 0.3$ | $\eta_{13} = 1.$ | |
| | $r_{14} = 105.008$ | $d_{14} = 11.5$ | $\eta_{14} = 1.52$ | $\nu_8 = 70.1$ |
| | $r_{15} = -3490.811$ | $d_{15} = 3.5$ | $\eta_{15} = 1.68893$ | $\nu_9 = 31.1$ |
| | $r_{16} = 236.160$ | $d_{16} = 12.6$ | $\eta_{16} = 1.$ | |
| | $r_{17} = -219.921$ | $d_{17} = 5.2$ | $\eta_{17} = 1.80518$ | $\nu_{10} = 25.5$ |
| | $r_{18} = -166.351$ | $d_{18} = 2.8$ | $\eta_{18} = 1.74$ | $\nu_{11} = 28.2$ |
| | $r_{19} = 72.853$ | $d_{19} = 8.4$ | $\eta_{19} = 1.$ | |
| | $r_{20} = -260.065$ | $d_{20} = 12.2$ | $\eta_{20} = 1.50137$ | $\nu_{12} = 56.5$ |
| | $r_{21} = -94.950$ | $d_{21} = 0.3$ | $\eta_{21} = 1.$ | |
| | $r_{22} = 156.004$ | $d_{22} = 7.7$ | $\eta_{22} = 1.62606$ | $\nu_{13} = 39.1$ |
| | $r_{23} = -578.679$ | | $\eta_{23} = 1.$ | | wherein $r_1$, $r_2$, $r_3$ ... are the curvature radii of the successive lenses as viewed from the object side, $d_1$, $d_2$ ... are the center thicknesses and the air spaces between the successive lenses, $\eta_1$, $\eta_2$ ... and $\nu_1$, $\nu_2$ ... are the refractive indices and the Abbe numbers of the successive lenses, respectively, $f_1$ is the focal length of the divergent lens group and $f_2$ is the focal length of the convergent lens group.

20. A wide-angle zoom lens system according to claim 14, having the numerical data as follows:

$$f = 100 - 137.8 - 190.3$$
$$Bf = 134.810 - 164.021 - 204.626$$

| | | | | |
|---|---|---|---|---|
| | $r_1 = 383.989$ | $d_1 = 20.2$ | $\eta_1 = 1.60311$ | $\nu_1 = 60.7$ |
| | $r_2 = 3490.811$ | $d_2 = 3.5$ | $\eta_2 = 1.64831$ | $\nu_2 = 33.8$ |
| | $r_3 = \infty$ | $d_3 = 1.4$ | $\eta_3 = 1.$ | |
| | $r_4 = 446.126$ | $d_4 = 5.2$ | $\eta_4 = 1.713$ | $\nu_3 = 53.9$ |
| $f_1 = -174.541$ | $r_5 = 86.883$ | $d_5 = 27.6$ | $\eta_5 = 1.$ | |
| | $r_6 = 436.547$ | $d_6 = 13.3$ | $\eta_6 = 1.713$ | $\nu_4 = 53.9$ |
| | $r_7 = 121.240$ | $d_7 = 22.3$ | $\eta_7 = 1.$ | |
| | $r_8 = 118.688$ | $d_8 = 14.7$ | $\eta_8 = 1.7552$ | $\nu_5 = 77.5$ |
| | $r_9 = 219.240$ | | $\eta_9 = 1.$ | |
| | | $d_9 = 118.1950 \sim 53.6056 \sim 6.4234$ | | |
| | $r_{10} = 179.532$ | $d_{10} = 14.0$ | $\eta_{10} = 1.52$ | $\nu_6 = 70.1$ |
| | $r_{11} = -691.181$ | $d_{11} = 5.2$ | $\eta_{11} = 1.68893$ | $\nu_7 = 31.1$ |
| | $r_{12} = -910.239$ | $d_{12} = 0.3$ | $\eta_{12} = 1.$ | |
| | $r_{13} = 83.43$ | $d_{13} = 25.1$ | $\eta_{13} = 1.52$ | $\nu_8 = 70.1$ |
| | $r_{14} = 522.516$ | $d_{14} = 0.3$ | $\eta_{14} = 1.$ | |
| | $r_{15} = 102.344$ | $d_{15} = 15.0$ | $\eta_{15} = 1.52$ | $\nu_9 = 70.1$ |
| $f_2 = 134.988$ | $r_{16} = 162.916$ | $d_{16} = 12.6$ | $\eta_{16} = 1.$ | |
| | $r_{17} = -212.311$ | $d_{17} = 5.2$ | $\eta_{17} = 1.80518$ | $\nu_{10} = 25.5$ |
| | $r_{18} = -166.351$ | $d_{18} = 2.8$ | $\eta_{18} = 1.74$ | $\nu_{11} = 28.2$ |
| | $r_{19} = 72.853$ | $d_{19} = 8.4$ | $\eta_{19} = 1.$ | |
| | $r_{20} = -260.065$ | $d_{20} = 12.2$ | $\eta_{20} = 1.50137$ | $\nu_{12} = 56.5$ |
| | $r_{21} = -94.950$ | $d_{21} = 0.3$ | $\eta_{21} = 1.$ | |
| | $r_{22} = 156.004$ | $d_{22} = 7.7$ | $\eta_{22} = 1.62606$ | $\nu_{13} = 39.1$ |
| | $r_{23} = -446.049$ | | $\eta_{23} = 1.$ | | wherein $r_1$, $r_2$, $r_3$ ... are the curvature radii of the successive lenses as viewed from the object side, $d_1$, $d_2$ ... are the center thicknesses and the air spaces between the successive lenses, $\eta_1$, $\eta_2$ ... and $\nu_1$, $\nu_2$ ... are the refractive indices and the Abbe numbers of the successive lenses, respectively, $f_1$ is the focal length of the divergent lens group and $f_2$ is the focal length of the convergent lens group.

21. A wide-angle zoom lens system according to claim 2, wherein said convergent lens group includes in the order from the object side a second positive component, a second positive meniscus component convex to the object side, a third negative component, a third positive meniscus component convex to the image side and a third positive component.

22. A wide-angle zoom lens system according to claim 21, wherein said optical system further satisfies the following conditions:

$$0.3 < \frac{|f_{12}|}{|f_1|} < 1.1$$

$$0.6 < \frac{|f_{13}|}{|f_1|} < 1.4$$

$$1.2 < \frac{f_{14}}{|f_1|} < 2.0$$

$$0.9 < \frac{f_{21}}{f_2} < 1.7$$

$$0.9 < \frac{f_{22}}{f_2} < 1.7$$

$$0.4 < \frac{f_{23}}{f_2} < 0.7$$

$$1.3 < \frac{|f_{24}|}{f_2} < 2.5$$

$$1.5 < \frac{f_{25}}{f_2} < 2.5$$

wherein $f_1$ and $f_2$ represent the focal length of the divergent group and of the convergent group, respectively, $f_{1i}$ and $f_{2i}$ represent the focal length of each component of the divergent group and of the convergent group, respectively, and the subscript i represents the order of each component from the object side.

23. A wide-angle zoom lens system according to claim 22, wherein said optical system further satisfies the following conditions:

$1.0 < Q_{11} < 1.5$
$1.0 < |Q_{12}| < 1.5$
$1.2 < |Q_{13}| < 1.7$
$2.0 < Q_{14} < 5.0$
$0.4 < Q_{21} < 1.0$
$1.2 < Q_{22} < 2.5$
$0.5 < |Q_{23}| < 0.9$
$1.5 < |Q_{24}| < 4.0$
$1.0 < Q_{25} < 2.5$ wherein $Q_{1i}$ and $Q_{2i}$ represent the shape factor of each component of the divergent group and of the convergent group, respectively, the subscript i represents the order of each component from the object side, shape factor Q being devined as $$Q = \frac{r_R + r_F}{r_R - r_F}$$

$r_R$ and $r_F$ represent the radius of curvature of the rearmost and the foremost surface of each component, respectively.

24. A wide-angle zoom lens system according to claim 23, having the numerical data as follows:

| | | | | |
|---|---|---|---|---|
| | f=100—137.40—190.97, F/3.5 Bf—120.91—146.73—183.71 | | | |
| $f_1 = -166.39$ | $r_1 = 121.861$ $r_2 = 862.970$ | $d_1 = 22.76$ $d_2 = 1.94$ | $\eta_1 = 1.60311$ | $\nu_1 = 60.7$ |
| | $r_3 = 450.452$ $r_4 = 63.915$ | $d_3 = 4.16$ $d_4 = 17.95$ | $\eta_2 = 1.6968$ | $\nu_2 = 55.6$ |
| | $r_5 = 458.957$ $r_6 = 96.595$ | $d_5 = 4.16$ $d_6 = 21.89$ | $\eta_3 = 1.71342$ | $\nu_3 = 53.9$ |
| | $r_7 = 93.687$ $r_8 = 167.216$ | $d_7 = 10.83$ $d_8 = 93.53 \sim 41.50 \sim 2.48$ | $\eta_4 = 1.69896$ | $\nu_4 = 30.0$ |
| $f_2 = 114.87$ | $r_9 = 107.864$ $r_{10} = -436.728$ | $d_9 = 23.87$ $d_{10} = 6.94$ | $\eta_5 = 1.62041$ | $\nu_5 = 60.3$ |
| | $r_{11} = 59.746$ $r_{12} = 179.704$ | $d_{11} = 13.07$ $d_{12} = 7.43$ | $\eta_6 = 1.62041$ | $\nu_6 = 60.3$ |
| | $r_{13} = -345.071$ $r_{14} = 57.356$ | $d_{13} = 13.08$ $d_{14} = 9.19$ | $\eta_7 = 1.80518$ | $\nu_7 = 25.5$ |
| | $r_{15} = -140.893$ $r_{16} = -73.702$ | $d_{15} = 8.01$ $d_{16} = 0.28$ | $\eta_8 = 1.62588$ | $\nu_8 = 35.6$ |
| | $r_{17} = 114.682$ $r_{18} = 951.608$ | $d_{17} = 8.40$ | $\eta_9 = 1.62588$ | $\nu_9 = 35.6$ | wherein $r_1, r_2, r_3 \ldots$ are the curvature radii of the successive lenses as viewed from the object side, $d_1, d_2 \ldots$ are the center thicknesses and the air spaces between the successive lenses, $\eta_1, \eta_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

25. A wide-angle zoom lens system according to claim 23, having the numerical data as follows:

| | | | | |
|---|---|---|---|---|
| | f=100—137.40—190.97, F/3.5 Bf—121.01—146.83—183.81 | | | |
| $f_1 = -166.39$ | $r_1 = 122.527$ $r_2 = 834.331$ | $d_1 = 22.76$ $d_2 = 1.94$ | $\eta_1 = 1.60311$ | $\nu_1 = 60.7$ |
| | $r_3 = 428.800$ $r_4 = 63.108$ | $d_3 = 4.16$ $d_4 = 18.36$ | $\eta_2 = 1.6968$ | $\nu_2 = 55.6$ |
| | $r_5 = 513.233$ $r_6 = 93.410$ | $d_5 = 4.16$ $d_6 = 18.72$ | $\eta_3 = 1.713142$ | $\nu_3 = 53.9$ |
| | $r_7 = 92.280$ $r_8 = 184.992$ | $d_7 = 10.83$ $d_8 = 96.316 \sim 44.285 \sim 5.264$ | $\eta_4 = 1.69895$ | $\nu_4 = 30.0$ |
| $f_2 = 114.87$ | $r_9 = 104.729$ $r_{10} = -124.514$ $r_{11} = -503.795$ | $d_9 = 19.71$ $d_{10} = 3.70$ $d_{11} = 6.94$ | $\eta_5 = 1.62041$ $\eta_6 = 1.62004$ | $\nu_5 = 60.3$ $\nu_6 = 36.3$ |
| | $r_{12} = 57.902$ $r_{13} = 249.004$ | $d_{12} = 14.1$ $d_{13} = 7.42$ | $\eta_7 = 1.5168$ | $\nu_7 = 64.2$ |
| | $r_{14} = -241.908$ $r_{15} = -184.314$ $r_{16} = 56.464$ | $d_{14} = 9.37$ $d_{15} = 2.78$ $d_{16} = 8.78$ | $\eta_8 = 1.80518$ $\eta_9 = 1.72825$ | $\nu_8 = 25.5$ $\nu_9 = 28.3$ |
| | $r_{17} = -199.298$ $r_{18} = -78.755$ | $d_{17} = 8.66$ $d_{18} = 0.28$ | $\eta_{10} = 1.62588$ | $\nu_{10} = 35.6$ |
| | $r_{19} = 103.430$ $r_{20} = 295.655$ | $d_{19} = 7.96$ | $\eta_{11} = 1.62588$ | $\nu_{11} = 35.6$ | wherein $r_1, r_2, r_3 \ldots$ are the curvature radii of the successive lenses as viewed from the object side, $d_1, d_2 \ldots$ are the center thicknesses and the air spaces between the successive lenses, $\eta_1, \eta_2 \ldots$ and $\nu_1, \nu_2 \ldots$ are the refractive indices and the Abbe numbers of the successive lenses, respectively, $f_1$ is the focal length of the divergent lens group and $f_2$ is the focal length of the convergent lens group.

* * * * *